United States Patent
Miller et al.

(10) Patent No.: US 9,477,002 B2
(45) Date of Patent: Oct. 25, 2016

(54) MICROHYDRAULIC FRACTURING WITH DOWNHOLE ACOUSTIC MEASUREMENT

(75) Inventors: Douglas E. Miller, Boston, MA (US); Ahmad Latifzai, Katy, TX (US); Romain Charles Andre Prioul, Somerville, MA (US); Bruce A. MacKay, Sugar Land, TX (US); Oliver C. Mullins, Ridgefield, CT (US); Andreas Hausot, Tokyo (JP); Canyun Wang, Tokyo (JP); Alireza Farahani, Yokohama (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 945 days.

(21) Appl. No.: 12/430,914

(22) Filed: Apr. 28, 2009

(65) Prior Publication Data

US 2010/0157737 A1    Jun. 24, 2010

Related U.S. Application Data

(63) Continuation-in-part of application No. PCT/US2008/087970, filed on Dec. 22, 2008.

(60) Provisional application No. 61/016,161, filed on Dec. 21, 2007.

(51) Int. Cl.
   *G01V 1/46*    (2006.01)
   *E21B 33/124*  (2006.01)
   (Continued)

(52) U.S. Cl.
   CPC .............. *G01V 1/46* (2013.01); *E21B 33/124* (2013.01); *E21B 43/26* (2013.01); *E21B 47/101* (2013.01)

(58) Field of Classification Search
   CPC ..... G01V 1/40; G01V 1/46; G01V 2210/646
   USPC ............. 367/25, 35, 31; 181/102, 104–106; 166/250.1
   See application file for complete search history.

(56) References Cited

U.S. PATENT DOCUMENTS 4,641,724 A *  2/1987  Chow et al. .................. 181/104
4,797,859 A    1/1989  Hornby
(Continued)

FOREIGN PATENT DOCUMENTS

| FR | 2867858 A1 | 9/2005 |
| WO | 02088522 A1 | 11/2002 |
| WO | 2005100978 A1 | 10/2005 |

OTHER PUBLICATIONS

Prioul, R., A., Donald, R., Koepsell, Z. El Marzouki, T., Bratton, 2007, "Forward modeling of fracture-induced sonic anisotropy using a combination of borehole image and sonic logs", Geophysics, vol. 72, pp. E135-E147.

(Continued)

*Primary Examiner* — Krystine Breier
(74) *Attorney, Agent, or Firm* — Daryl R. Wright; Jody DeStefanis

(57) ABSTRACT

Methods and related systems are described for measuring acoustic signals in a borehole during a fracturing operation. The system includes a downhole toolstring designed and adapted for deployment in a borehole formed within a subterranean rock formation. A downhole rock fracturing tool opens and propagates a fracture in the subterranean rock formation. Dipole and/or quadrupole acoustic sources transmit acoustic energy into the subterranean rock formation. A receiver array measures acoustic energy traveling through the subterranean rock formation before, during and after the fracture induction. Geophones mounted on extendable arms can be used to measure shear wave acoustic energy traveling in the rock formation. The toolstring can be constructed such that the sources and receivers straddle the fracture zone during the fracturing. Alternatively, the sources or the receivers can be co-located axially with the fracture zone, or the toolstring can be repositioned following fracturing such that the fracture zone is between the acoustic sources and receivers.

44 Claims, 23 Drawing Sheets

(51) Int. Cl.
*E21B 43/26* (2006.01)
*E21B 47/10* (2012.01)

(56) References Cited

U.S. PATENT DOCUMENTS

| | | | |
|---|---|---|---|
| 4,831,600 A * | 5/1989 | Hornby et al. | 367/31 |
| 4,860,581 A | 8/1989 | Zimmerman et al. | |
| 4,936,139 A | 6/1990 | Zimmerman et al. | |
| 5,111,903 A * | 5/1992 | Meynier | 181/102 |
| 5,214,251 A | 5/1993 | Orban et al. | |
| 5,475,650 A * | 12/1995 | Sinha | G01V 1/44 367/27 |
| 5,859,811 A | 1/1999 | Miller | |
| 6,510,389 B1 | 1/2003 | Winkler et al. | |
| 6,678,616 B1 | 1/2004 | Winkler et al. | |
| 6,714,873 B2 * | 3/2004 | Bakulin et al. | 702/14 |
| 6,837,322 B2 * | 1/2005 | Jurado et al. | 180/65.245 |
| 6,837,332 B1 * | 1/2005 | Rodney | 181/105 |
| 6,930,616 B2 * | 8/2005 | Tang et al. | 340/854.4 |
| 7,002,142 B2 * | 2/2006 | Mullins et al. | 250/269.1 |
| 7,336,562 B1 | 2/2008 | Hoyle et al. | |
| 7,364,007 B2 | 4/2008 | Garcia-Osuna et al. | |
| 7,457,194 B2 | 11/2008 | Prioul et al. | |
| 7,460,435 B2 | 12/2008 | Garcia-Osuna | |
| 7,543,635 B2 * | 6/2009 | East | E21B 43/26 166/179 |
| 7,577,528 B2 * | 8/2009 | Li et al. | 702/6 |
| 9,103,203 B2 | 8/2015 | Miller et al. | |
| 2005/0204808 A1 | 9/2005 | DiFoggio | |
| 2006/0254767 A1 | 11/2006 | Pabon et al. | |
| 2007/0215345 A1 * | 9/2007 | Lafferty et al. | 166/250.1 |
| 2008/0128131 A1 * | 6/2008 | Nguyen et al. | 166/280.2 |
| 2008/0151691 A1 * | 6/2008 | Eisner et al. | 367/38 |
| 2009/0238988 A1 * | 9/2009 | McDaniel et al. | 427/487 |
| 2009/0319307 A1 * | 12/2009 | Carlson | 705/7 |

OTHER PUBLICATIONS

Prioul, R.,, J.Jocker, P. Montaggioni, L Escare (2008), "Fracture compliance estimation using a combination of image and sonic logs", SEG Las Vegas 2008 Annual Meeting, pp. 314-318.

Prioul, R., C., Signer, A., Boyd, A., Donald, R., Koepsell, T., Bratton, D., Heliot, X., Zhan, 2007, "Discrimination of fracture and stress effects using image and sonic logs hydraulic fracturing design," The Leading Edge, Sep. 2007, pp. 1134-1139.

Franco et. al. "Sonic Investigations In and Around the Borehole," Oilfield Review, Spring 2006, pp. 14-33.

Office Action issued in related ID Application No. P00201000298 mailed Mar. 24, 2016, with partial English translation by agent (3 pages).

Office Action issued in related ID Application No. W00200903262 mailed Jan. 29, 2013, with English translation by agent (4 pages).

Office Action issued in related ID Application No. W00200903262 mailed Nov. 9, 2015, with partial English translation by agent (3 pages).

Office Action issued in related GC Application No. GCC/P/2008/12528 mailed Nov. 10, 2012 (6 pages).

International Search Report and Written Opinion issued in related International Application No. PCT/US2008/087970 mailed Nov. 3, 2010 (12 pages).

Bratton et al., "Rock Strength Parameters From Annular Pressure While Drilling and Dipole Sonic Dispersion Analysis", SPWLA 45th Annual Logging Symposium, Jun. 6-9, 2004, 14 pages.

Burns et al., "Determination of In-Situ Permeability from Tube Wave Velocity and Attenuation", SPWLA Twenty-Seventh Annual Logging Symposium, Jun. 9-13, 1986, 16 pages.

Patzek et al., "Lossy transmission line model of hydrofractured well dynamics", Journal of Petroleum Science and Engineering, vol. 25, Issues 1-2, Jan. 2000, pp. 59-77.

Plona et al., "Effects of stress cycles on static and dynamic Young's moduli in Castlegate sandstone", Proceedings of the 35th U.S. Symposium on Rock Mechanics, 1995, pp. 155-160.

Sinha, "Estimation of formation nonlinear constants by sonic measurements while changing borehole pressures", 66th Seg Annual Meeting, Nov. 10-15, 1996, pp. 118-121.

Sinha et al., "Influence of borehole overpressurization and plastic yielding on the Stoneley and flexural dispersions", Journal of Geophysical Research, vol. 104, No. B7, Jul. 10, 1999, pp. 15,451-15,459.

Winkler, "Acoustic evidence of mechanical damage surrounding stressed boreholes", Geophysics, vol. 62, No. 1, Jan. 1997, pp. 16-22.

Winkler, "Azimuthal velocity variations caused by borehole stress concentrations", Journal of Geophysical Research, vol. 101, No. B4, Apr. 10, 1996, pp. 8615-8621.

* cited by examiner

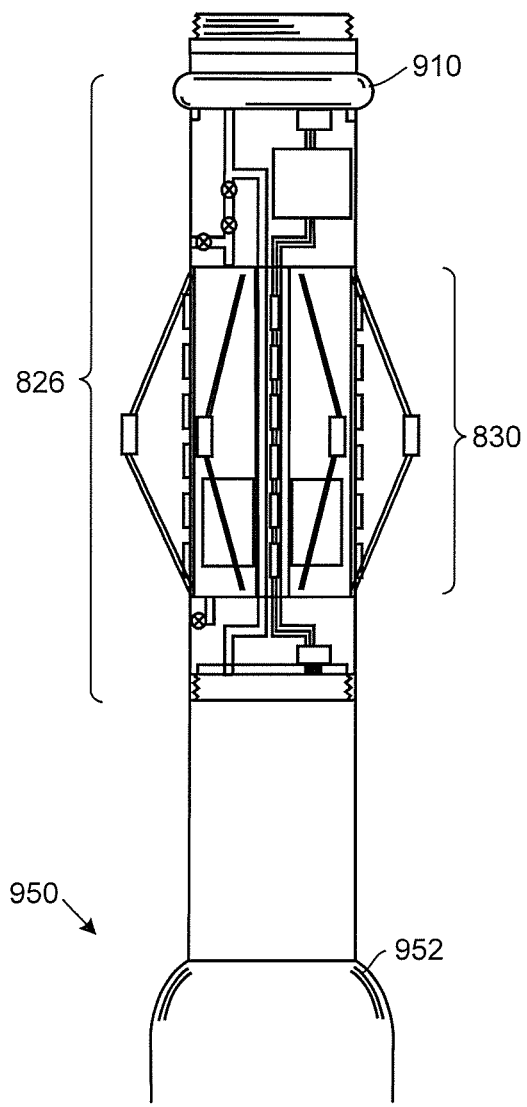
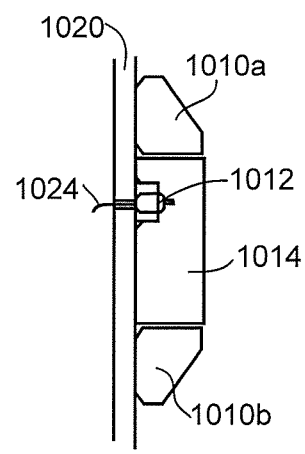
Fig. 9
Fig. 10

MICROHYDRAULIC FRACTURING WITH DOWNHOLE ACOUSTIC MEASUREMENT

CROSS-REFERENCE TO RELATED APPLICATIONS

This patent application is a continuation-in-part of International Patent Application PCT/US08/87970, filed Dec. 22, 2008, which is incorporated by reference herein. This patent application claims benefit of U.S. Provisional Patent Application No. 61/016,161, filed on Dec. 21, 2007.

BACKGROUND OF THE INVENTION

1. Field of the Invention

This patent specification relates to downhole acoustic measurements in connection with downhole fluid sampling and testing. More particularly, this patent specification relates to systems and methods for making and analyzing acoustic measurements in combination with a downhole hydraulic fracturing tool system.

2. Background of the Invention

In the oilfield service industry, characterizing commercially viable reservoirs of hydrocarbons is a main objective of well logging services. Downhole sampling and testing tools such as the Modular Dynamic Formation Tester (MDT) from Schlumberger are used during the well logging phase to gain a more direct assessment of the production characteristics of the accumulation. In one common configuration, the MDT is arranged with dual packers set against the borehole wall, thereby creating an isolated fluid interval in the annulus bounded by the tool outer surface, the borehole wall, and the two inflatable packers. Additional modules within the MDT enable controlled changes in pressure and flow in the interval. According to this conventional configuration, the pressure is monitored by pressure gauges designed to record the average pressure approximately once per second. During some types of operations, for example fluid sampling operations, fluid is drawn from the annular packed-off region into the tool. Although the onset of a change in the fluid properties of the annular region is often eventually detected by sensors within the tool body, it is often desirable to improve evaluation of the such changes and to obtain the information more quickly.

In some types of testing operations, rapid changes in pressure sometimes occur. For example, in a microhydraulic fracturing test, the interval is pressurized by pumping fluid into the annulus until a tensile fracture begins. The initiation is recorded by a breakdown on a pressure-vs-time record sampled at about one sample per second. It is desirable to evaluate these rapid changes in greater detail. Further detail of acoustic measurements during microhydraulic fracturing testing and in connection with other downhole sampling and testing tool systems is disclosed in International Patent Application PCT/US08/87970, filed Dec. 22, 2008 which is incorporated by reference herein. It is desirable to further improve the evaluations of the formation when performing microhydraulic fracturing testing. Additionally since the sampling and testing tools have pumps, valves and many other moving parts, it is desirable to more effectively monitor the operation of these moving parts.

SUMMARY OF THE INVENTION

According to embodiments, system for measuring acoustic signals in a borehole during a fracturing operation is provided. The system includes a downhole toolstring designed and adapted for deployment in a borehole formed within a subterranean rock formation. A downhole rock fracturing tool forms part of the toolstring, and is designed and adapted to open and propagate a fracture in the subterranean rock formation. One or more acoustic sources are mounted to the toolstring, and are designed and adapted to transmit acoustic energy into the subterranean rock formation. One or more acoustic sensors are also mounted to the toolstring, and are designed and adapted to measure part of the acoustic energy traveling through the subterranean rock formation.

According to embodiments, a method for measuring acoustic signals in a borehole during a fracturing operation is provided. The method includes positioning a downhole toolstring in a borehole formed within a subterranean rock formation; inducing fracturing in rock formation using a rock fracturing tool forming part of the toolstring; transmitting acoustic energy into the rock formation using one or more acoustic sources mounted to the toolstring; and measuring acoustic energy traveling through the rock formation using one or more acoustic sensors mounted to the toolstring.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 9 shows the receiver module of FIG. 8 mounted within a microhydraulic fracturing and fluid sampling tool, according to embodiments;

FIG. 10 shows further detail of an acoustic sensor mounted on a receiver module, according to some embodiments;

DETAILED DESCRIPTION OF THE PREFERRED EMBODIMENTS

Figure 1:
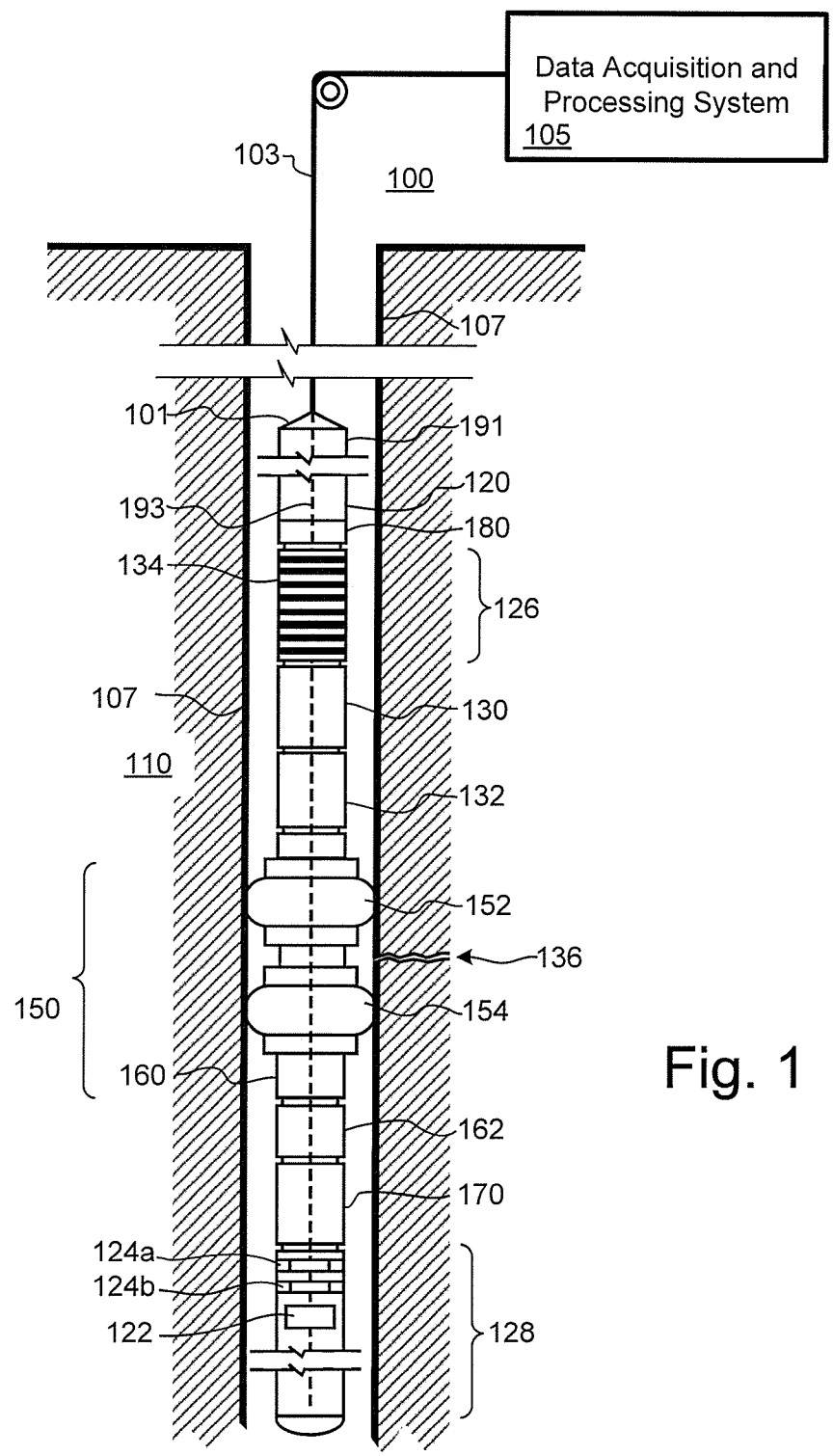
FIG. 1 shows a downhole system for making acoustic measurements with a downhole microhydraulic fracturing and fluid sampling tool, according to embodiments.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

It has been found that by making and properly recording acoustic and/or micro-acoustic frequency measurements, in-situ evaluations of rock mechanical properties and environmental stress can be performed. For example, by monitoring changes in the rock's acoustic response before, during and/or after the creation of a mini-hydraulic fracture, such evaluations can be made. According to embodiments, evaluating minimum stress direction stress and estimation of hydraulic fracture compliance by detecting changes in acoustic propagation can be accomplished using a combination of the mini-hydraulic fracturing tool such as Schlumberger's MDT tool, and an acoustic tool having cross dipole sources and receivers, such as Schlumberger's Sonic Scanner tool. In addition, the combination of known stress test procedures and an acoustic monitoring device can be used to get a more accurate closure pressure time to estimate the magnitude of the minimum stress.

When a fracture in a rock formation is induced by hydraulic fracturing (or drilling) process, the fracture azimuth is related to stress directions. Acoustic tool such as Schlumberger's Sonic Scanner tool can be used to detect fracture azimuth by looking for changes in cross-dipole shear anisotropy due to the induced or natural fracture. See, e.g. Prioul, R., C., Signer, A., Boyd, A., Donald, R., Koepsell, T., Bratton, D., Heliot, X., Zhan, 2007, "Discrimination of fracture and stress effects using image and sonic logs hydraulic fracturing design," The Leading Edge, September 2007; and Prioul, R., A., Donald, R., Koepsell, Z. El Marzouki, T., Bratton, 2007, "Forward modeling of fracture-induced sonic anisotropy using a combination of borehole image and sonic logs," Geophysics, Vol. 72, pp. E135-E147, both of which are incorporated by reference herein. Furthermore, acoustic data from a tool such as Schlumberger's Sonic Scanner can be used to estimate the fracture compliance property required to assess area of fracture and further geomechanical analysis. See, e.g. U.S. Pat. No. 7,457,194; and Prioul, R., J. Jocker, P. Montaggioni, L. Escare, "Fracture compliance estimation using a combination of image and sonic logs," SEG 2008, both of which are incorporated by reference herein.

According to embodiments, the ability is provided to detect mechanical and acoustic changes depending on the stress state and the fracture adding excess compliance to the rock system at the time the log is run (after the pressure has returned to equilibrium). According to some embodiments, the effect is enhanced, and hence, the measurement made more robust, by making the acoustic measurements while the fracture is still held open by the annular pressure in the MDT interval. According to other embodiments, the acoustic measurements are made while the fracture is held open by a proppant material that is significantly compliant in shear. Moreover, by measuring the acoustic response before and during fracture opening, the data can be analyzed to determine complex fracture trajectories and estimate hydraulic fracture compliances. For instance, early in the fracture growth the hoop stress dominates and the fracture growth is responsive to hoop stress geometries. The corresponding interpretation determines the direction and geometry of the fracture subject to this near wellbore condition. As the fracture continues to grow, differential analysis of the acoustic signature coupled with previous determinations of the characteristics of the (growing) fracture enables the evolution of the fracture to be determined.

Various embodiments are described herein, with many having the following components in common:

1. A cross-dipole transmitter (e.g. a vibration-generating device capable of creating vibration with mirror-antisymmetry with respect to either of two mutually orthogonal axial planes) such as the transmitter section of Schlumberger's Sonic Scanner tool;

2. A fracturing device (FD), such as the dual-packer MDT tool from Schlumberger, capable of generating, in an axisymmetric way, pressure sufficient to initiate and grow a fracture in an isolated interval of borehole; and 3. A cross-dipole receiver (e.g. a vibration-sensing device capable of detecting vibration with mirror-antisymmetry with respect to either of two mutually orthogonal axial planes) such as the receiver section of Schlumberger's Sonic Scanner tool.

FIG. 1 shows a downhole system for making acoustic measurements with a downhole microhydraulic fracturing and fluid sampling tool, according to embodiments. Wireline logging system 100 is shown including multiple tools for taking geophysical measurements. Wireline 103 is a power and data transmission cable that connects the tools to a data acquisition and processing system 105 on the surface. The tools connected to the wireline 103 are lowered into a well borehole 107 to obtain measurements of geophysical properties for the surrounding subterranean rock formation 110. The wireline 103 supports tools by supplying power to the tool string 101. Furthermore, the wireline 103 provides a communication medium to send signals to the tools and to receive data from the tools.

The tools, sometimes referred to as modules are typically connected via a tool bus 193 to telemetry unit 191 which is turn is connects to the wireline 103 for receiving and transmitting data and control signals between the tools and the surface data acquisition and processing system 105. Commonly, the tools are lowered to a particular depth of interest in the borehole and are then retrieved by reeling-in by the data acquisition and processing system 105. For sampling and testing operations, such as Schlumberger's MDT tool, the tool is positioned at location and data is collected while the tool is stationary and sent via wireline 103 to data acquisition and processing system 105 at the surface, usually contained inside a logging truck or logging unit (not shown).

Electronic power module 120 converts AC power from the surface to provide DC power for all modules in the tool string 101. Pump out module 130 is used to pump unwanted fluid, for example mud filtrate, from the formation to the borehole, so that representative samples can be taken from formation 110. Pump out module 130 can also be used to pump fluid from the borehole into the flowline for inflating packers in module containing inflatable packers. Pump out module 130 can also be configured to transfer fluid from one part element of the tool string to another. Hydraulic module 132 contains an electric motor and hydraulic pump to provide hydraulic power as may be needed by certain modules. The tool string 101 can also include other sensor such as a strain gauge and a high resolution CQG gauge. Examples of a fluid sampling system using probes and packers are depicted in U.S. Pat. Nos. 4,936,139 and 4,860,581 where are incorporated by reference herein.

Dual-packer module 150 includes an upper inflatable packer element 152, lower packer element 154, valve body 160 and electronics 162. Inflatable packer elements 152 and 154 seal against the borehole wall 107 to isolate an interval of the borehole. Pumpout Module 130 inflates the packers with wellbore fluid. The length of the test interval (i.e., the distance between the packers) about 3.2 ft (0.98 m) and can be extended by inserting spacers between the packer elements. The area of the isolated interval of the borehole is about many orders of magnitude larger than the area of the borehole wall isolated by a probe. Dual-packer module 150 can be used to perform micro-hydraulic fracturing that can be pressure tested to determine the minimum in situ stress magnitude. A fracture, such as fracture 136, is created by pumping wellbore fluid into the interval between the inflatable packer elements. Below dual-packer module 150 are one or more sample chamber units 170 for holding fluid samples collected downhole.

According to embodiments, tool string 101 is provided with one or more acoustic transmitters and receivers for making acoustic measurements in connection with downhole fluid sampling and or testing. Transmitter module 128 can be a transmitter section of a wireline deployable sonic tool such as from the Sonic Scanner Tool from Schlumberger. Transmitter module 128 includes one or more monopole acoustic transmitters 122 that can produce strong pressure pulses or "clicks" generating clear P- and S-waves, from low frequency Stoneley mode to high frequency energy useful for some types of evaluations. Transmitter module 128 also includes two dipole transmitters 124a and 124b, which essentially are shaking devices, each consisting of an electromagnetic motor mounted in a cylinder suspended in the tool housing. The dipole sources generate a high-pressure dipole signal without inducing significant vibration in the tool housing. The dipole sources 124a and 124b are oriented orthogonally with respect to each other, such that one vibrates in line with the tool reference axis and the other at 90 degrees to the axis. The dipole sources generate strong flexural modes that propagate up and down the borehole and also into the formation to different depths that depend on their frequencies. According to embodiments, the dipole sources 124a and 124b are designed generate frequencies in a sweep from about 300 Hz to 8 kHz.

According to some embodiments, the transducer elements of sources 124a and 124b are arcuate shaped and are designed an arranged such that they can be excited separately in a selected pattern to effectively excite other acoustic modes, such as quadrupole and higher-order modes. According to some embodiments, for example, each source 124a and 124b includes four-quadrant arcuate shaped members which are operated to generate quadrupole mode acoustic energy into the wellbore and rock formation. For further description of suitable transducer elements including arcuate shaped transducers for generating monopole, dipole, quadrupole and high-order modes, see e.g. U.S. Pat. No. 7,460,435, U.S. Pat. No. 7,364,007, and U.S. Patent Application Publication No. 2006/0254767, each of which are incorporated by reference herein.

The receiver module 126 is a multi-pole receiver unit such as the receiver section of the Sonic Scanner Tool from Schlumberger. Receiver module 126 includes a number, for example 13, of axial receiver stations 134 in a 6 foot (1.8 meter) receiver array. Each receiver station includes eight azimuthally distributed acoustic receivers, placed every 45 degrees for a total of 104 sensors on module 126. The receiver module is preferably constructed using a central mandrel having a mass-spring structure. For further details of a suitable acoustic transmitter and receiver modules having mass-spring structure and a central mandrel, see e.g. U.S. Pat. No. 7,336,562, and Franco et. al. "Sonic Investigations In and Around the Borehole," Oilfield Review, Spring 2006, pp. 16-45, each of which are incorporated herein by reference.

According to some embodiments, a geopositioning and inclinometry tool 180 is also included in toolstring 101. Tool 180 includes both a three-axis inclinometer and a three-axis magnetometer to make measurement for determining tool orientation in terms of three parameters: tool deviation, tool azimuth an relative bearing. According to some embodiments, a tool such as Schlumberger's General Purpose Inclinometry Tool (GPIT) is used for tool 180. The measurements from tool 180 can be used for orientation of the acoustic sensors. Although not shown, it is understood that a geopositioning and inclinometry tool such as described herein can be included in the embodiments described with respect to FIGS. 2-5 below.

Note that unlike many commercially used acoustic tools such as Schlumberger's Sonic Scanner Tool, the transmitter module 128 does not have to be synchronized with the receiver module 126. Additionally, as long as the orientation of the transceiver module 128 is not changed during the measurement procedure, the tool orientation need to be controlled or known. Preferably, the orientation of the receiver module 126 is known, and the receiver module 126 is capable of listening continuously or repeatedly with a substantial duty cycle. Also, according to some embodiments, the source time signature is controlled and known with enough precision to allow the received signal to be stacked for noise reduction and processed to determine relative orientation of the source and receiver dipoles. It has been found to be sufficient, for example, to have alternating pulses in the two dipole orientations repeated continuously with a precisely known delay between successive pulses. According to alternative embodiments, m-sequences, sweeps, or chirps are used.

According to some embodiments, source dipoles can be denoted SA and SB. Receiver dipoles can be denoted Ra, Rb, and are not assumed to be parallel with SA, SB. The source firing schedule should alternate long (for example, 10 second) repetitions of SA and SB, followed by interleaved repetitions with a precisely controlled delay. Since the source firing schedule is known, the long states (LSA, LSB) can be known and separated timewise. Receiver states Ra and Rb are separate channels in the recording. Thus the total recorded signal during the long states can be partitioned into four distinct components LSARa, LSARb, LSBRa, LSBRb. Signal energy (sum of squared signal amplitude) from these components are then analyzed using known methods (for example, the Alford Rotation method) to determine rotation unit vectors to be used to minimize cross-energy.

If the initial state of the rock is Transversely Isotropic with its symmetry axis aligned to the borehole, this minimization will only depend on the relative angle between source and receiver rotations, which will be a measure of the orientation of the source. In an orthorhombic initial state (as can be expected with unequal horizontal stresses), the minimum will only be achieved when the receivers are rotated to align to the orthorhombic stress symmetry planes and the sources are rotated to align with the receivers.

After rotation, the received signal in the interleaved data will show delays between repetitions that are slightly large when alternating from slow to fast directions and slightly small when alternating from fast to slow and hence can be used to determine which are the fast and slow shear directions. Without a time synchronization between source and receiver, absolute traveltime will not be directly measureable. However, since velocity across the receiver array can be measured, equations requiring a reference traveltime can use a reference traveltime obtained by dividing the known Transmitter/Receiver spacing by this measured velocity at the receiver. Note that the determination of relative source orientation need only be performed once.

As the fracture is created and grown, the azimuthal anisotropy becomes larger both in the energy difference and time difference between fast and slow directions. Time-lapse processing, in which baseline waveforms are subtracted to enhance the ability to see slight changes or drifts, are useful here. Time reference for this subtraction may be obtained either by aligning on some detected feature in the waveforms, or by maximizing cross-correlation, or by relying upon the known, precise repetition rate of the source.

Figure 2:
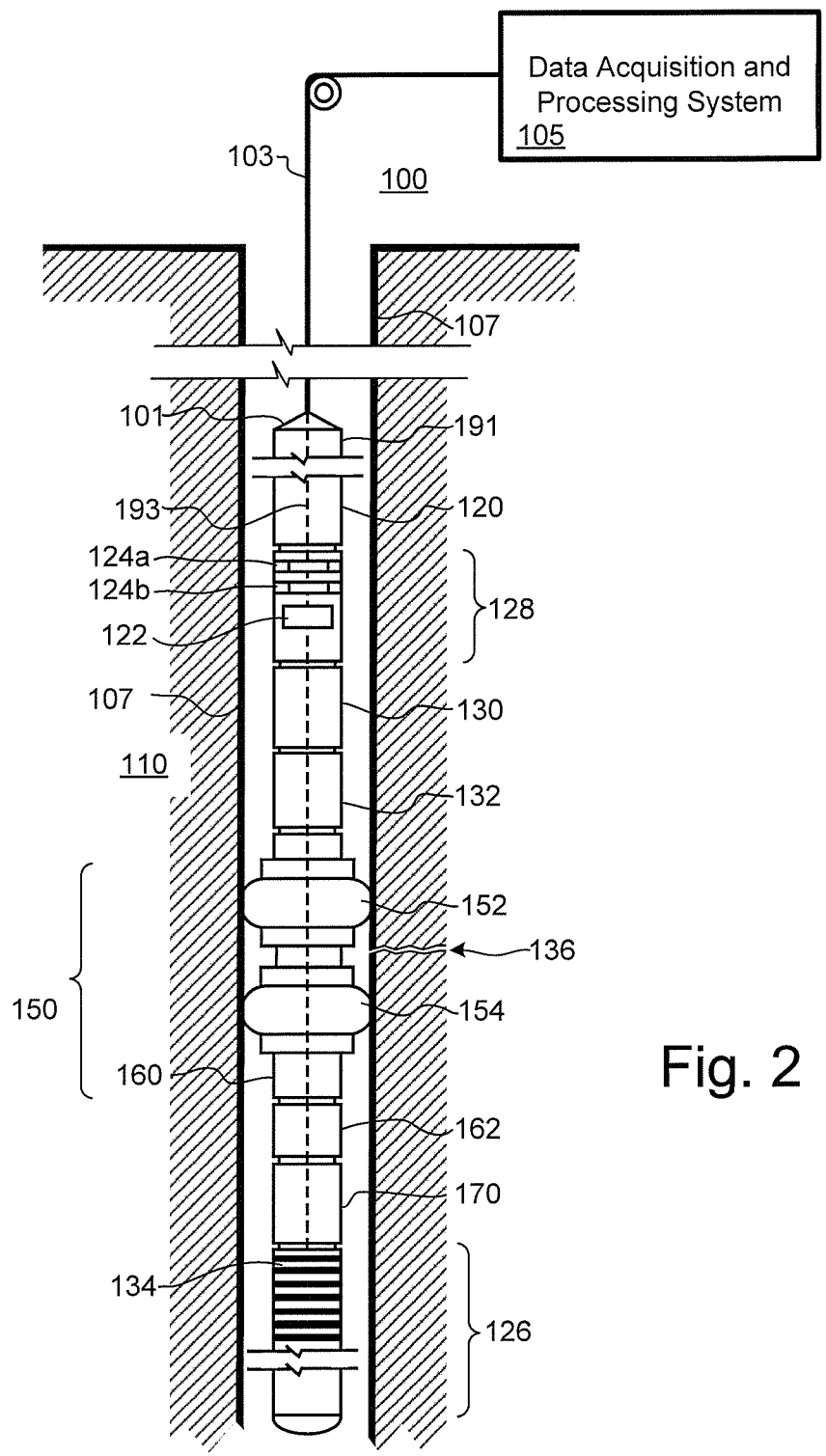
FIG. 2 shows a downhole system for making acoustic measurements with a downhole microhydraulic fracturing and fluid sampling tool, according to embodiments.

FIG. 2 shows a downhole system for making acoustic measurements with a downhole microhydraulic fracturing and fluid sampling, according to embodiments. The system of FIG. 2 is very similar to that of FIG. 1 with like reference numbers used for the same modules. However in the embodiment of FIG. 2 the positions of the transmitter module 128 and the receiver module 126 on toolstring 101 are switched such that the transmitter module 128 is located above the dual packer module 150 and the receiver module 126 is located below dual packer module 150.

Figure 3:
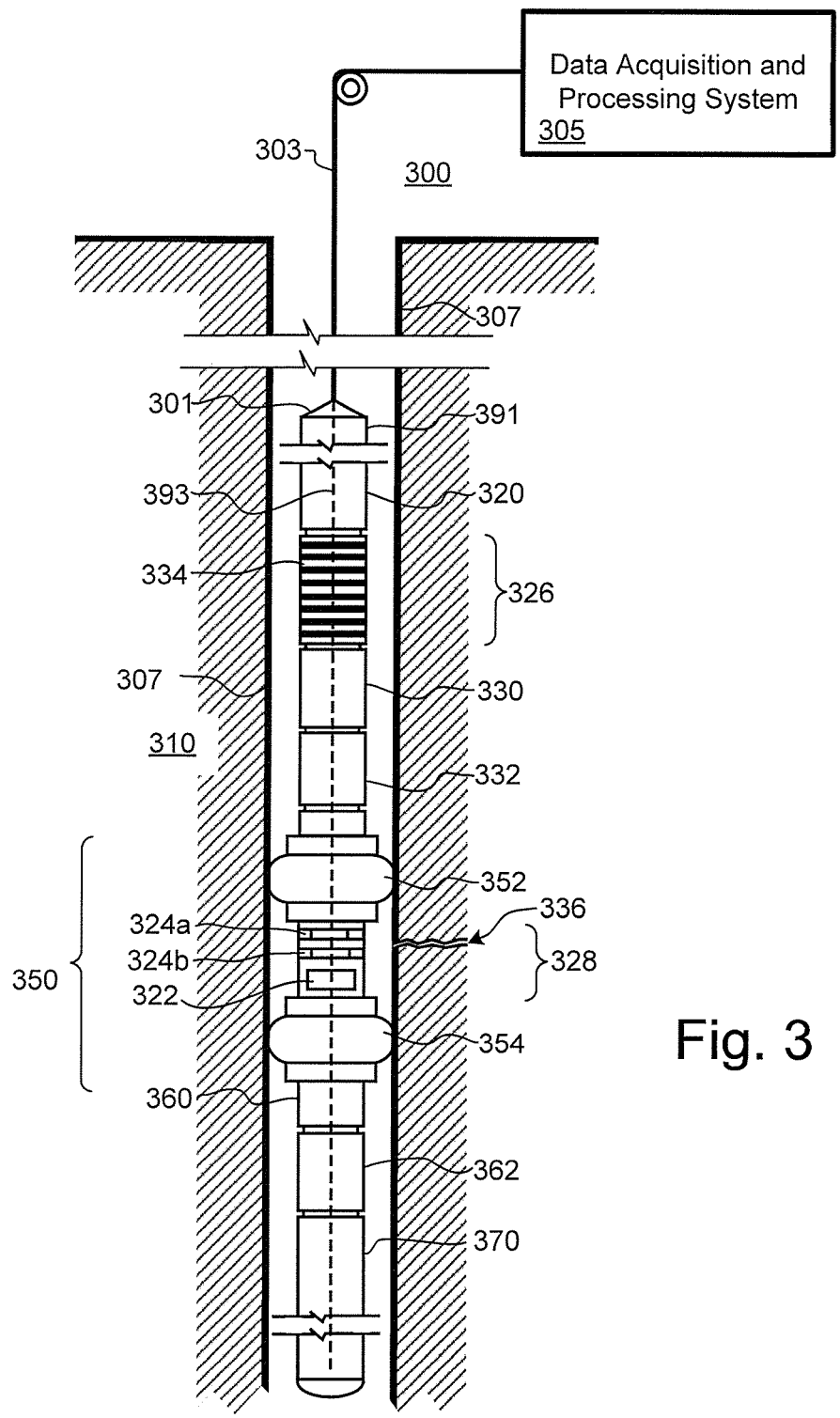
FIG. 3 shows a downhole system for making acoustic measurements with a downhole microhydraulic fracturing and fluid sampling tool, according to other embodiments.

FIG. 3 shows a downhole system for making acoustic measurements with a downhole microhydraulic fracturing and fluid sampling tool, according to other embodiments. Similar to the systems shown in FIGS. 1-2, wireline logging system 300 includes multiple tools for taking geophysical measurements. Wireline 303 is a power and data transmission cable that connects the tools to a data acquisition and processing system 305 on the surface. The tools connected to the wireline 303 are lowered into a well borehole 307 to obtain measurements of geophysical properties for the surrounding subterranean rock formation 310. The wireline 303 supports tools by supplying power to the tool string 301. Furthermore, the wireline 303 provides a communication medium to send signals to the tools and to receive data from the tools.

The tools are connected via a tool bus 393 to telemetry unit 391 which is turn is connects to the wireline 303 for receiving and transmitting data and control signals between the tools and the surface data acquisition and processing system 305. The tool is positioned at a location and data is collected while the tool is stationary and sent via wireline 303 to data acquisition and processing system 305 at the surface, usually contained inside a logging truck or logging unit (not shown). Similar to the system shown in FIG. 1, electronic power module 320, pump out module 330, and hydraulic module 332 are provided.

Tool string 301 also includes a receiver module 326, which is similar to module 126 shown and described with respect to FIG. 1. Receiver module 326 includes a number, for example 13, of axial receiver stations 334 in a 6 foot (1.8 meter) receiver array, and each receiver station includes eight azimuthally distributed acoustic receivers, placed every 45 degrees.

Dual-packer module 350 includes an upper inflatable packer element 352, lower packer element 354, valve body 360 and electronics 362. Inflatable packer elements 352 and 354 seal against the borehole wall 307 to isolate an interval of the borehole. Pumpout Module 330 inflates the packers with wellbore fluid. Dual-packer module 350 can be used to perform micro-hydraulic fracturing that can be pressure tested to determine the minimum in situ stress magnitude. A fracture, such as fracture 336 is created by pumping wellbore fluid into the interval between the inflatable packer elements. The packer module 350 includes an autonomous acoustic source 328. Source 328 is similar to transmitter module 128 shown and described with respect to FIG. 1, and includes one or more monopole acoustic transmitters 322 as well as two multi-pole (e.g. dipole or quadrupole) transmitters 324a and 324b. According to embodiments, source 328 is autonomous and is programmed to fire on a precise regular schedule while using measuring the acoustic response using receiver module 326. These acoustic measurements are carried out preferably before, during and after the formation of fracture 336. Below dual-packer module 350 are one or more sample chamber units 370 for holding fluid samples collected downhole.

Figure 4:
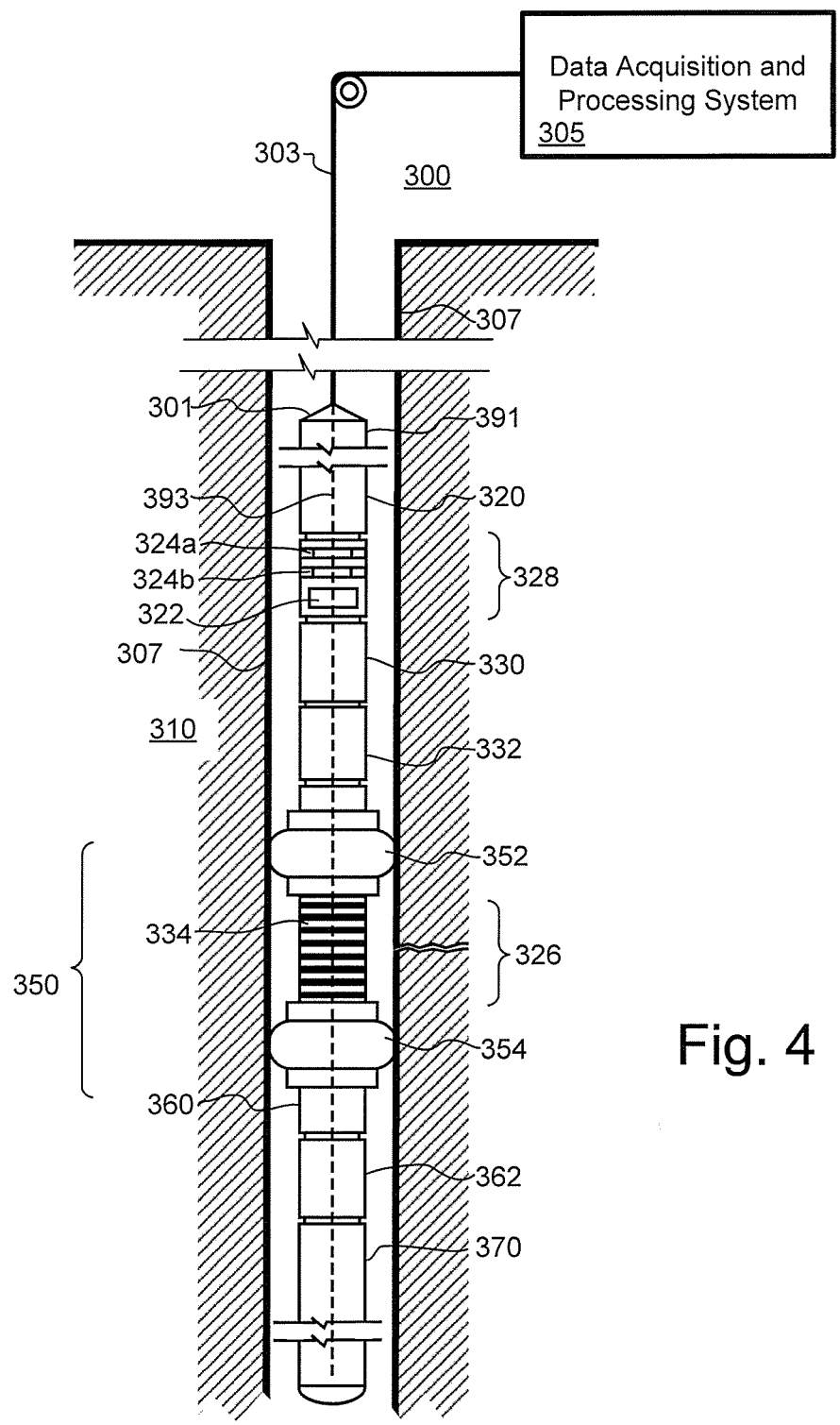
FIG. 4 shows a downhole system for making acoustic measurements with a downhole microhydraulic fracturing and fluid sampling tool, according to further embodiments.

FIG. 4 shows a downhole system for making acoustic measurements with downhole microhydraulic fracturing and fluid sampling, according to further embodiments. The system of FIG. 4 is very similar to that of FIG. 3 with like reference numbers used for the same modules. However in the embodiment of FIG. 4 the positions of the source 328 and the receiver module 326 on toolstring 301 are switched such that source 328 is located above the dual packer module 350 and the receiver module 326 is located between the packers of dual packer module 350.

Figure 5:
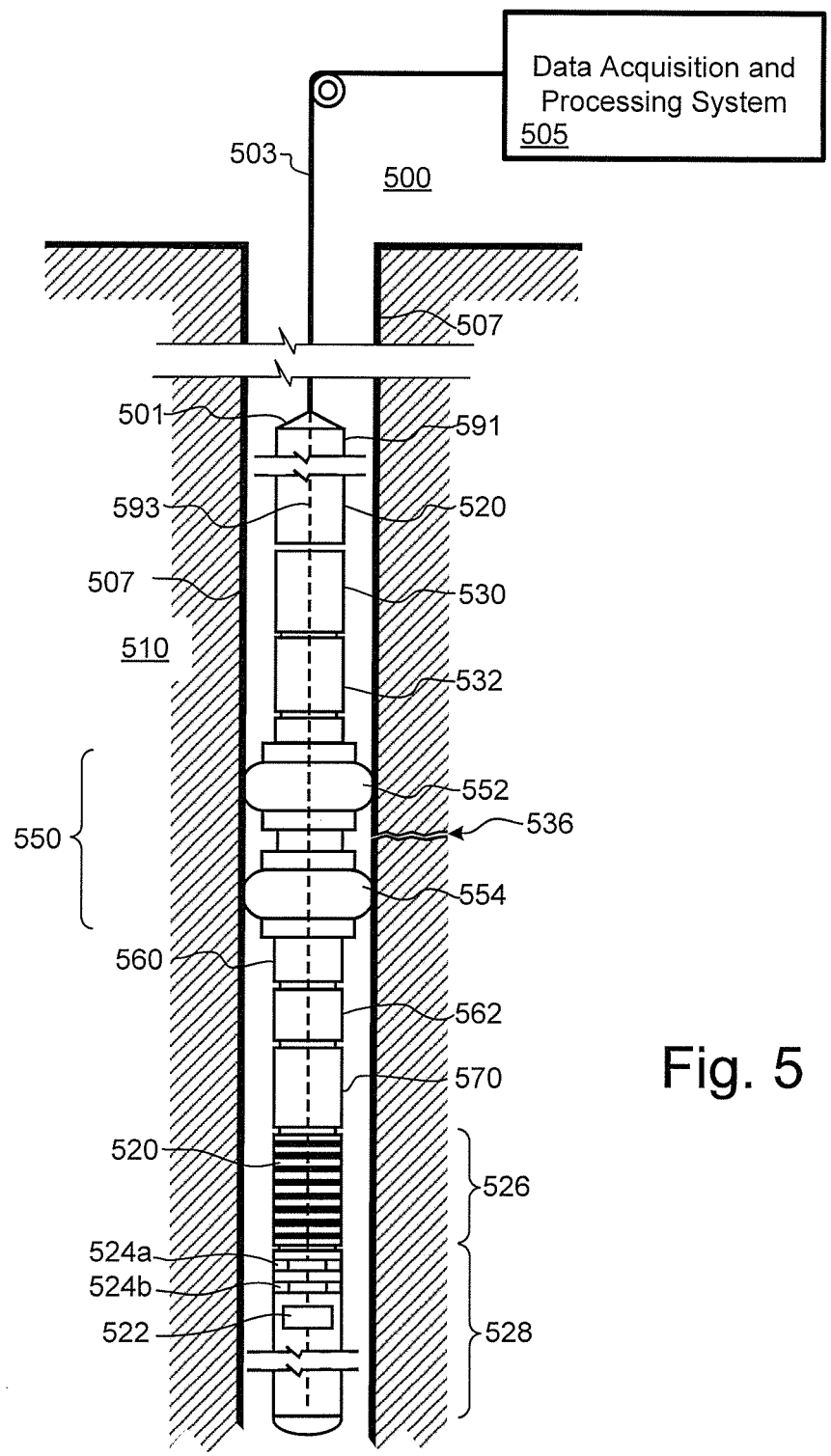
FIG. 5 shows a downhole system for making acoustic measurements with a downhole microhydraulic fracturing and fluid sampling tool, according to yet further embodiments.

FIG. 5 shows a downhole system for making acoustic measurements with downhole microhydraulic fracturing and fluid sampling, according to yet further embodiments. Similar to the systems shown in FIGS. 1-4, wireline logging system 500 includes multiple tools for taking geophysical measurements. Wireline 503 connects the tools to a data acquisition and processing system 505 on the surface. The tools connected to the wireline 503 are lowered into a well borehole 507 to obtain measurements of geophysical properties for the surrounding subterranean rock formation 510. The wireline 503 supports tools by supplying power to the tool string 501, and provides a communication medium to send signals to the tools and to receive data from the tools. The tools are connected via a tool bus 593 to telemetry unit 591 which is turn is connects to the wireline 503. The tool is positioned at a location and data is collected while the tool is stationary and sent via wireline 503 to data acquisition and processing system 505 at the surface. Similar to the systems shown in FIGS. 1-4, electronic power module 520, pump out module 530, and hydraulic module 532 are provided.

Dual-packer module 550 includes an upper inflatable packer element 552, lower packer element 554, valve body 560 and electronics 562. Inflatable packer elements 552 and 554 seal against the borehole wall 507 to isolate an interval of the borehole. Pumpout Module 530 inflates the packers with wellbore fluid. Dual-packer module 550 can be used to perform micro-hydraulic fracturing that can be pressure tested to determine the minimum in situ stress magnitude. A fracture, such as fracture 536 is created by pumping wellbore fluid into the interval between the inflatable packer elements. Below dual-packer module 550 are one or more sample chamber units 570 which can be used for holding fluid samples collected downhole. According to some embodiments, sample chamber units 570 can also be used to hold proppant material which is pumped into the packed-off interval and into the fracture 536, as will be described in further detail herein.

Tool string 501 also includes a receiver module 526, which is similar to module 126 shown and described with respect to FIG. 1. Receiver module 526 includes a number, for example 13, of axial receiver stations 534 in a 6 foot (1.8 meter) receiver array, and each receiver station includes eight azimuthally distributed acoustic receivers, placed every 45 degrees. Tool string 501 also includes a transmitter module 528 is similar to transmitter module 128 shown and described with respect to FIG. 1. Transmitter module 528 includes one or more monopole acoustic transmitters 522 as well as two multi-pole (e.g. dipole or quadrupole) transmitters 524a and 524b.

According to some embodiments, stored in one or more of the sample chamber units 570 is a proppant material that is significantly compliant in shear and which can decay with time over a relatively short period.

Examples of a suitable proppant material include: (1) calcined calcium carbonate, which can be dissolved using mild acid; (2) polylactic, polyglycolic acid beads or the like in water, which dissolve at various rates as temperature increases; (3) crystalline sodium chloride in a sodium chloride solution, which can be dissolved by "flowing back" or circulating pure water; and (4) magnesium oxide which can be dissolved by circulating an ammonium chloride solution. According to other embodiments, the fracture 536 is propagated with a resinous material such as polyurethane, epoxy or other curing polymeric material that forms a solid mass after a predetermined time.

Figure 6:
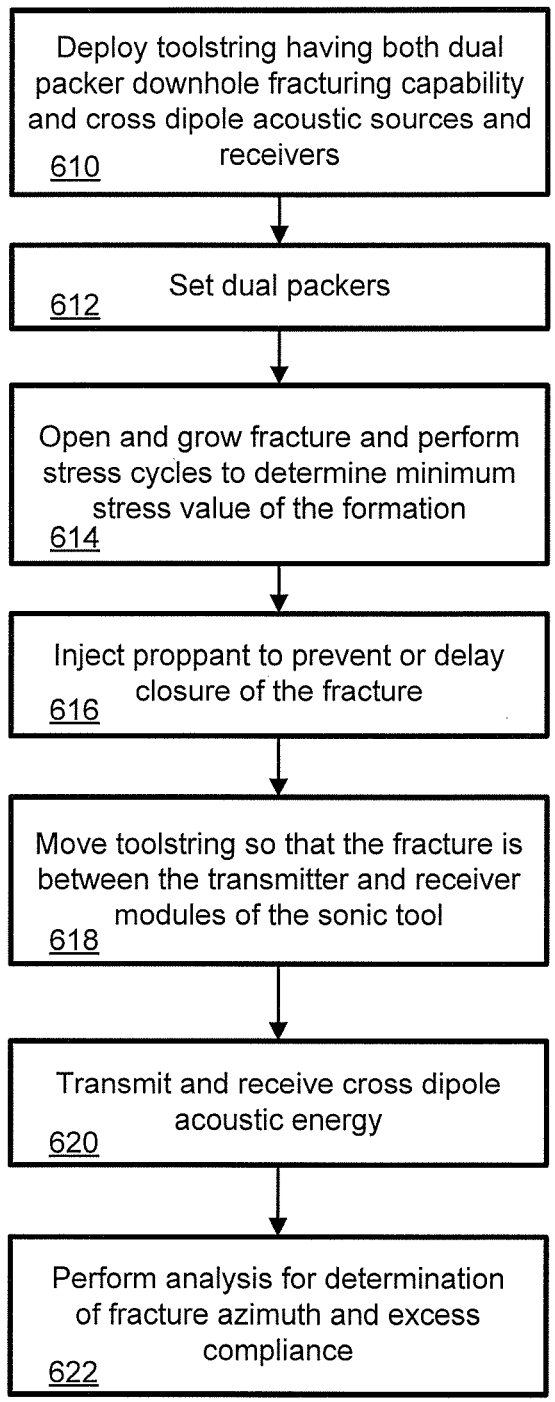
FIG. 6 is a flow chart showing steps in running an system as shown in FIG. 5, according to embodiments.

FIG. 6 is a flow chart showing steps in running an system as shown in FIG. 5, according to embodiments. In step 610, a toolstring having both dual packer downhole fracturing capability and cross dipole acoustic sources and receivers, such as shown in FIG. 5, deployed downhole. In step 612, the dual packers are set. In step 614, the rock fracturing is initiated. After opening and growing the fracture with the fracturing tool module, stress cycles are performed to determine minimum stress value of the formation (i.e. until the fracture exits the hoop stress region and fully enters the far field stress region). In step 616, proppant material is injected into the fracture to prevent or delay the fracture closure.

In step 618, the tool combination is shifted so that the fracture is between the transmitter and receiver sections of the sonic tool. In step 620, the sonic tool transmitters generate dipole acoustic energy and the sonic tool receivers measure the response. In step 622, an analysis is performed for determination of fracture azimuth and excess compliance. The analysis can be as described, for example, in: Prioul, R., A., Donald, R., Koepsell, Z. El Marzouki, T., Bratton, 2007, Forward modeling of fracture-induced sonic anisotropy using a combination of borehole image and sonic logs, Geophysics, Vol. 72, pp. E135-E147; and Prioul, R., J. Jocker, P. Montaggioni, L. Escare (2008), Fracture compliance estimation using a combination of image and sonic logs, SEG 2008, which is incorporated by reference herein.

Figures 7A, 7B:
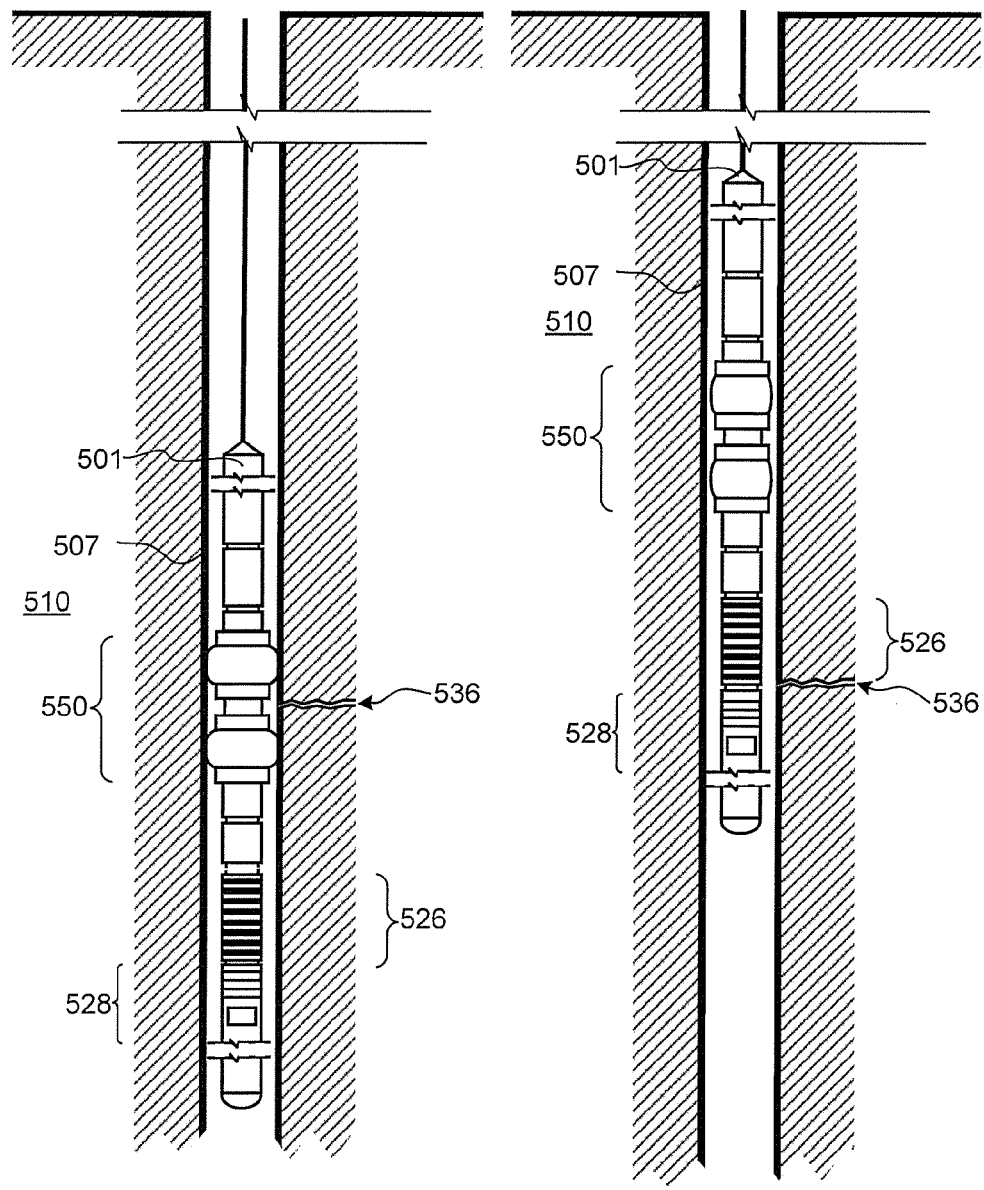
FIGS. 7a and 7b show repositioning of a downhole system such as shown in FIG. 5, according to some embodiments.

According to some embodiments, time-lapse processing, in which baseline waveforms are subtracted to enhance the ability to see slight changes or drifts, and to make evaluations of rock properties at locations further from the borehole than would be possible without such subtraction techniques. Time reference for this subtraction may be obtained either by aligning on some detected feature in the waveforms, or by maximizing cross-correlation, or by relying upon the known, precise repetition rate of the source. For further detail in analyzing the sonic and ultrasonic waveforms, see, U.S. Pat. No. 5,859,811, which is incorporated by reference herein FIGS. 7a and 7b show repositioning of a downhole system such as shown in FIG. 5, according to some embodiments. In FIG. 7a, toolstring 501 is positioned such that dual packer module 550 is able to isolate an annular region and create fracture 536. As described herein, a proppant material is injected into fracture 536 such that the fracture remains open long enough for the toolstring to be repositioned and for acoustic measurements to be made. In FIG. 7b, The toolstring 501 is shown repositioned such that the induced fracture 536 is between acoustic transmitter module 528 and acoustic receiver module 526.

Figure 8:
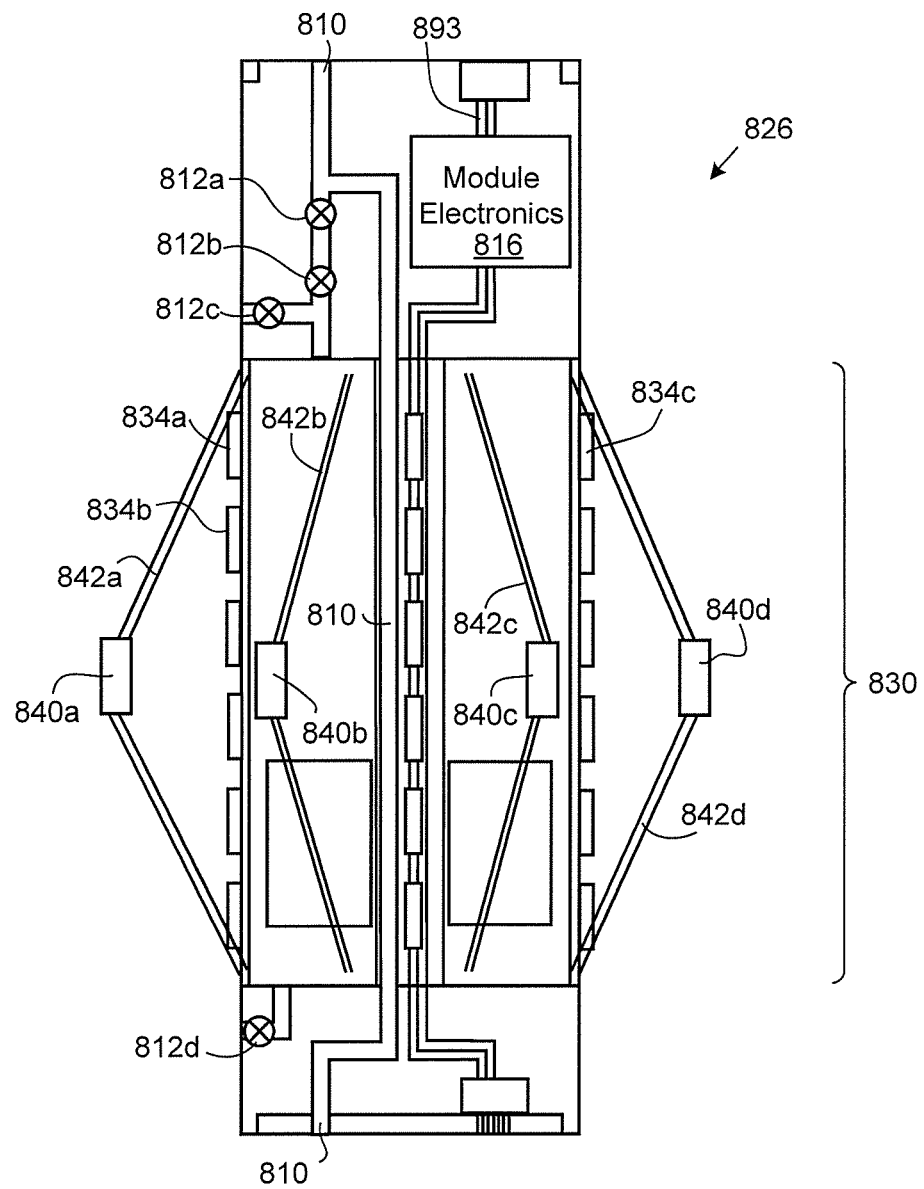
FIG. 8 shows further detail of a receiver module for making acoustic measurements with a downhole microhydraulic fracturing and fluid sampling tool, according to some embodiments.

FIG. 8 shows further detail of a receiver module for making acoustic measurements with a downhole microhydraulic fracturing and fluid sampling tool, according to some embodiments. Receiver module 826 includes sensor section 830. Sensor section 830 includes a number of sensors, including acoustic sensors and 3-axis geophones. A number of acoustic sensors, for example, sensors 834a and 834b are mounted on the surface of sensor section 830. In this example, four azimuthally spaced acoustic sensors are mounted in each station, and there are six stations for a total of 24 acoustic sensors on sensor section 830. Six geophones are also included in sensor section 830, four geophones are shown in the view of FIG. 8, namely geophones 840a, 840b, 840c and 840d. Each geophone is mounted on an extendable arm so as to be in contact with the borehole wall during measurement. The extendable arms are similar to those used on centralizer arms commonly used in downhole tools. Geophones 840a, 840b, 840c and 840d are shown mounted on arms 842a, 842b, 842c and 842d, respectively. Each of the geophones are 3-axis and by contacting the borehole wall, they allow for recording of both compressional and shear components of the incident acoustic waves. According to some embodiments, the geophones are also capable of receiving micro-acoustic emissions at ultrasonic frequency.

Flowline 810 allows for fluid communication between other modules of the microhydraulic fracturing and fluid sampling tool which may be located both above and below receiver module 826 as described elsewhere herein. Valves 812a, 812b, 812c and 812d may be manual or automatically closed depending on the hydraulic layout of the tool system. Control signals to and data from both the acoustic sensors and geophones on sensor section 830 are sent and received from module electronics 816. Module electronics 816, in turn, sends and receives data with the rest of the tool system and with the surface via tool bus 893.

FIG. 9 shows the receiver module of FIG. 8 mounted within a microhydraulic fracturing and fluid sampling tool, according to embodiments. In the example shown, receiver module 826 is mounted immediately above dual packer module 950 and below other modules such as a pump out module and/or a hydraulic module (not shown) as described in FIG. 1. According to some embodiments, a bumper guard 910 is provided to protect the sensors on sensor section 830. The bumper guard 910 is useful, for example, in cases where extendable arms are not used in connection with geophones. Note although the receiver module 830 is shown immediately above the dual packer module 950 in FIG. 8, the receiver module as described in FIGS. 8 and 9 can be used in other positions and incorporated into other modules as shown and described with respect to FIGS. 1-5 herein.

FIG. 10 shows further detail of an acoustic sensor mounted on a receiver module, according to some embodiments. A sonic detector 1012 is shown mounted on tool housing wall 1020. A detector housing 1014 surrounds the detector 1012, which receives control signals and sends data via wire 1024 passing through a small hole in housing 1020. Additionally, guards 1010a and 1010b are provided to protect the detector from mechanical damage in the downhole environment.

It has been found that by making and properly recording acoustic and/or micro-acoustic frequency measurements, additional information about the fluids, reservoir rocks and their state of stress can be learned. For example, the resonant period for acoustic pulses reverberating in the annulus interval will be sensitive to the bulk modulus of the fluid(s) in the interval, the compliance of the packers, and to the hoop strength of the borehole wall. Changes in fluid property (e.g. by influx of gas) or rock strength (e.g. due to tensile failure) are associated with observable changes in this period. Similarly, changes in viscosity of the fluid(s) or permeability of the borehole wall are associated with observable changes in attenuation of acoustic pulses.

Figure 11:
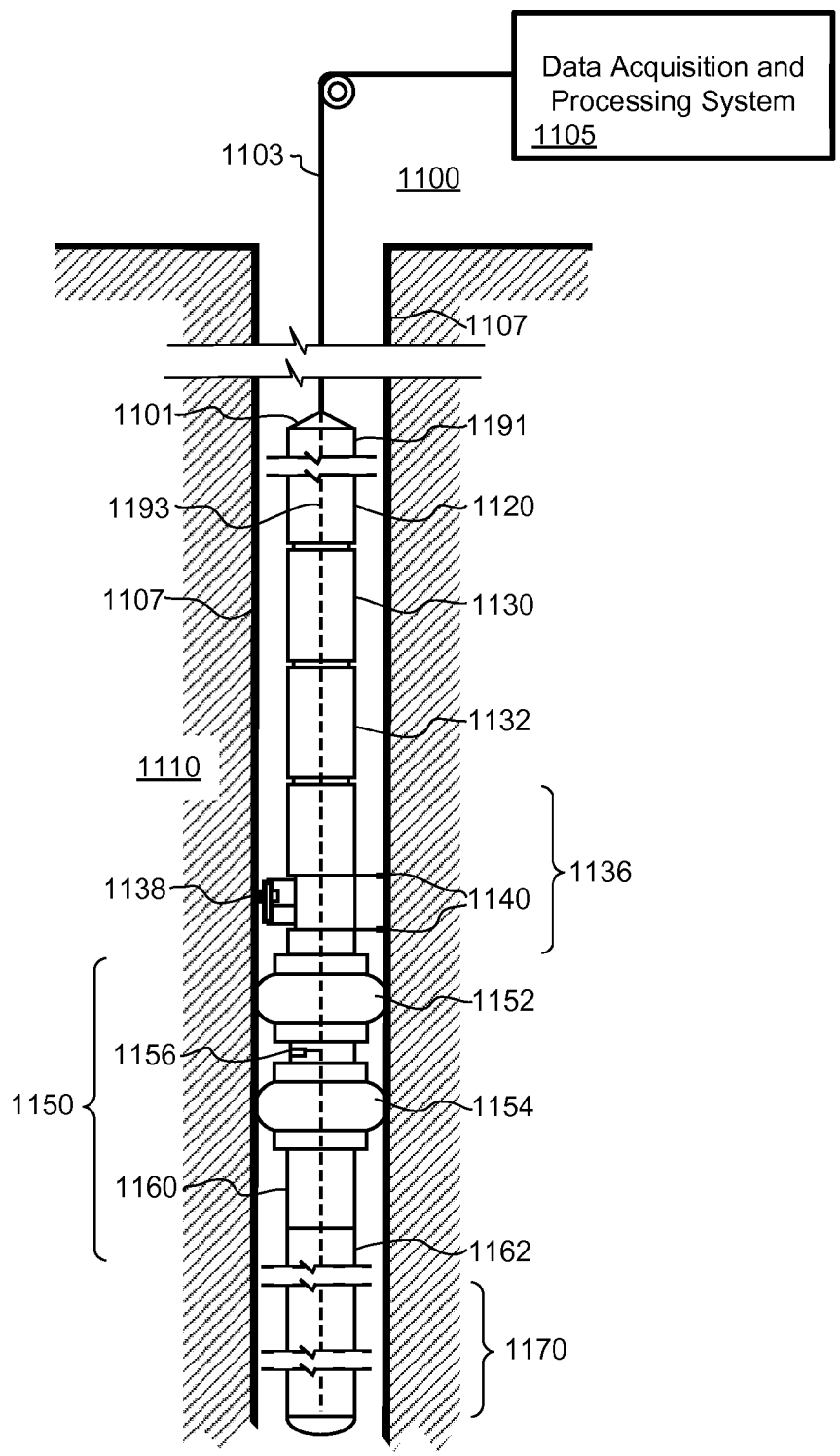
FIG. 11 shows a downhole system for making acoustic measurements with a downhole fluid sampling tool, according to embodiments.

FIG. 11 shows a downhole system for making acoustic measurements with a downhole fluid sampling tool, according to embodiments. Wireline logging system 1100 is shown including multiple tools containing sensors for taking geophysical measurements. Wireline 1103 is a power and data transmission cable that connects the tools to a data acquisition and processing system 1105 on the surface. The tools connected to the wireline 1103 are lowered into a well borehole 1107 to obtain measurements of geophysical properties for the surrounding subterranean rock formation 1110. The wireline 1103 supports tools by supplying power to the tool string 1101. Furthermore, the wireline 1103 provides a communication medium to send signals to the tools and to receive data from the tools.

The tools, sometimes referred to as modules are typically connected via a tool bus 1193 to telemetry unit 1191 which is turn is connects to the wireline 1103 for receiving and transmitting data and control signals between the tools and the surface data acquisition and processing system 1105. Commonly, the tools are lowered to a particular depth of interest in the borehole and are then retrieved by reeling-in by the data acquisition and processing system 1105. For sampling and testing operations, such as Schlumberger's MDT tool, the tool is positioned at location and data is collected while the tool is stationary and sent via wireline 1103 to data acquisition and processing system 1105 at the surface, usually contained inside a logging truck or logging unit (not shown).

Electronic power module 1120 converts AC power from the surface to provide DC power for all modules in the tool string 1101. Pump out module 1130 is used to pump unwanted fluid, for example mud filtrate, from the formation to the borehole, so that representative samples can be taken from formation 1110. Pump out module 1130 can also be used to pump fluid from the borehole into the flowline for inflating packers in module containing inflatable packers. Pump out module 1130 can also be configured to transfer fluid from one part element of the tool string to another. Hydraulic module 1132 contains an electric motor and hydraulic pump to provide hydraulic power as may be needed by certain modules. Single-probe module 1136 contains probe assembly 1138 having a packer and telescoping backup pistons 1140. Single-probe module 1136 may also contain pressure gauges, fluid resistivity, and temperature sensors, and a pretest chamber (now shown). The probe module 1136 also includes strain gauge and a high resolution CQG gauge. Examples of a fluid sampling system using probes and packers are depicted in U.S. Pat. Nos. 4,936,139 and 4,860,581 where are incorporated by reference herein.

According to embodiments, dual-packer module 1150 is provided with one ore more acoustic transducers for making acoustic measurements in connection with downhole fluid sampling and or testing. Dual-packer module 1150 includes an upper inflatable packer element 1152, lower packer element 1154, valve body 1160 and electronics 1162. Inflatable packer elements 1152 and 1154 seal against the borehole wall 1107 to isolate an interval of the borehole. Pumpout Module 1130 inflates the packers with wellbore fluid. The length of the test interval (i.e., the distance between the packers) about 3.2 ft (0.98 m) and can be extended by inserting spacers between the packer elements. The area of the isolated interval of the borehole is about many orders of magnitude larger than the area of the borehole wall isolated by a probe such as probe 1138. For fluid sampling, the large area results in flowing pressures that are only slightly below the reservoir pressure, which avoids or reduces phase separation for pressure-sensitive fluids such as gas condensates or volatile oils. In low-permeability formations, high drawdown usually occurs with the probe, whereas the fluid can be withdrawn from the formation using the dual-packer module 1150 with minimum pressure drop through the larger flowing area. Dual-packer module 1150 can be used for pressure transient testing, following a large-volume flow from the formation, the resulting pressure buildup has a radius of investigation of 50 to 80 ft (15 to 24 m). Similar to a small-scale drillstem test (DST), this type of testing offers advantages over conventional DST tests. It is environmentally friendly because no fluids flow to the surface, and it is cost effective because many zones can be tested in a short time. Dual-packer module 1150 can also be used to create a microhydraulic fracture that can be pressure tested to determine the minimum in situ stress magnitude. The fracture is created by pumping wellbore fluid into the interval between the inflatable packer elements. According to embodiments, acoustic transducer 1156 is mounted on dual-packer module 1150 are used to monitor the sampling and testing carried out with dual-packer module 1150. Below dual-packer module 1150 are one or more sample chamber units 1170 for holding fluid samples collected downhole.

Figure 12A:
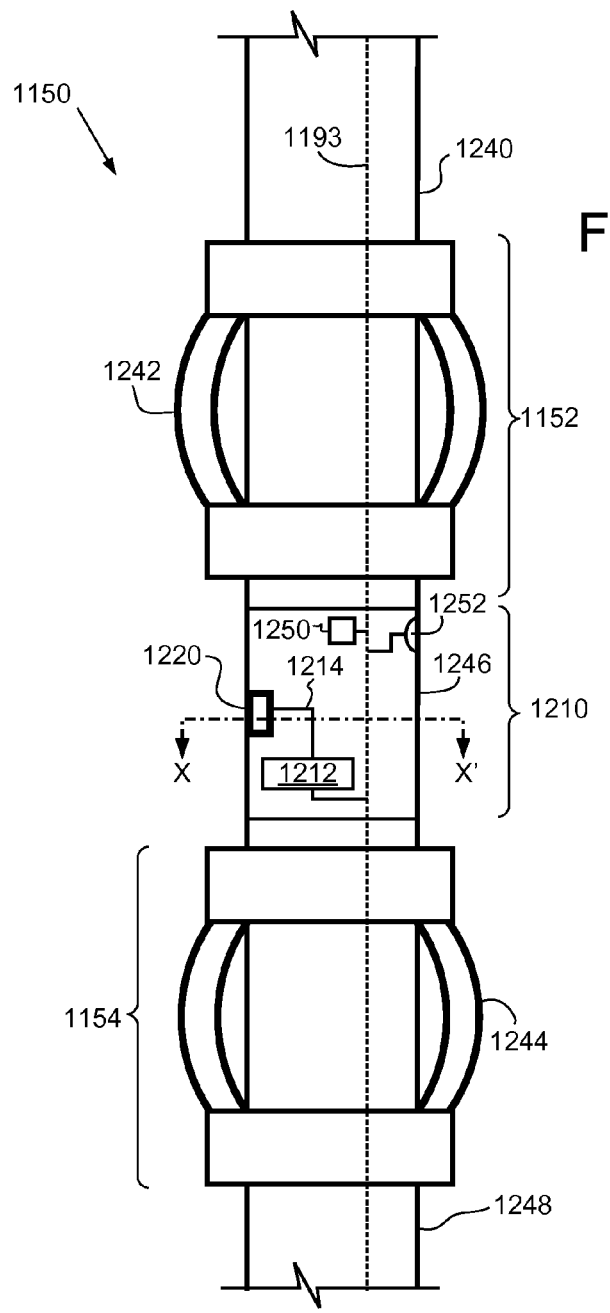
FIGS. 12A-12B show further detail of a dual-packer module with an acoustic transducer, according to embodiments.
Figure 12B:
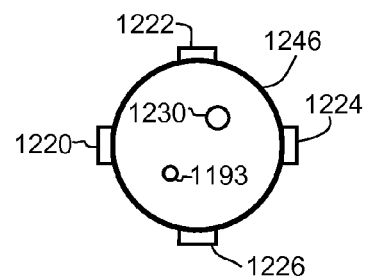

FIGS. 12A-B show further detail of a dual-packer module with an acoustic transducer, according to embodiments. Dual-packer module 1150 includes upper inflatable packer element 1152 and lower inflatable packer element 1154. The upper packer element 1152 includes inflatable member 1242 which is securely mounted on rigid or semi-rigid mandrel section 1240. The lower packer element 1154 includes inflatable member 1244 which is securely mounted on rigid or semi-rigid mandrel section 1248. Between the two packer elements is an acoustic sensor element 1210. Sensor element 1210 includes an acoustic transducer 1220 which is shown mounted on the exterior of mandrel section 1246. Mandrel sections 1240, 1248 and 1246 are centered in the borehole and parallel to the borehole axis when the packer elements are inflated. In this way, acoustic transducer can make measurements of acoustic energy in the annulus formed by the borehole wall, upper and lower packer elements and the mandrel. Acoustic transducer can also be used to actively produce acoustic energy for use in analysis as describe elsewhere herein. Acoustic transducer 1220 is controlled by electronics 1212 via electrical interconnect 1214. The electronics 1212 are used to activate transducer 1220 to produce acoustic energy and/or make measurements of acoustic energy. Electronics 1212 is controlled by and feeds data to other components and the surface via connection to tool bus 1193. The combination of electronics 1212 and acoustic transducer 1220 is capable of forming a dynamic acoustic sensor and making pressure measurements at 1 Hz sample rate recording continuously at an acoustic sample rate of at least 44.1 kHz. According to certain embodiments, the acoustic transducer is capable of generating and measuring ultrasonic energy in addition to or instead of sonic energy. FIG. 12B is a cross-section view along the line X-X' of FIG. 12A. As shown there are multiple acoustic transducers 1220, 1222, 1224 and 1226 mounted around the exterior of mandrel section 1246. By arranging the acoustic transducers in an array as shown, azimuthal information can be analyzed as is described in further detail herein. Also shown in FIG. 12B are toolbus 1193 and fluid flowline 1230. By providing an array of transducers azimuthally spaced apart transducers, multi directional data can be gathered. According to certain embodiments a directional sensor 1250 is also provided as part of sensor element 1210 so that the azimuthal position of the acoustic transducers is known in the well during measurement. Note that the directional sensor 1250 could be located in a different module within the toolstring.

According to an embodiment, a simple measurement using acoustic transducer 1220 is made in the annulus defined by the packer elements 1242 and 1244, mandrel section 1246 and the borehole wall (not shown). The pressure is measured at 1 Hz sample rate continuously up to 44.1 kHz. For some applications it is sufficient to listen passively. However, additional measurements, for example, changes in the system response due to changes in interval pressure are improved by repeatedly generate broadband pressure pulses. The pressure pulses can be generated either with pressure relief valves, or with a piezoelectric source 1252.

Figure 13A:
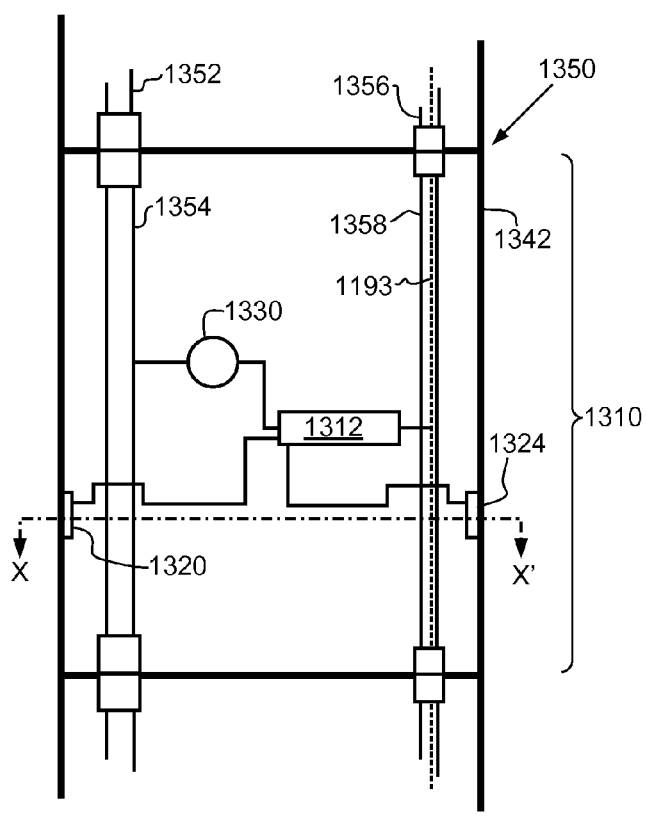
FIGS. 13A-13C show an acoustic sensor module forming part of a tool string, according to embodiments.
Figure 13B:
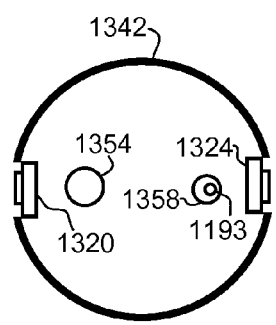
Figure 13C:
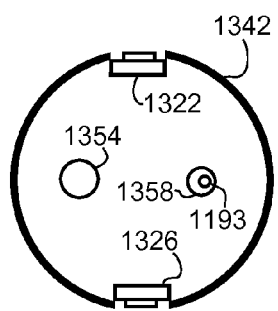

FIGS. 13A-13C show an acoustic sensor module forming part of a tool string, according to embodiments. Acoustic sensor module 1310 shown in FIG. 13A has a plurality of acoustic transducers including acoustic transducers 1320, 1324 and 1330 that are controlled by electronics 1312 via electrical interconnections. The acoustic transducers 1320 and 1324 are positioned and designed for providing measurements of acoustic energy propagating in the fluid outside the tool body. Therefore, acoustic isolation is provided in the form of a floating mechanical connection with the tool, thereby greatly decoupling the tool vibrations form the transducers. In particular, the sensor housing is spring loaded (not shown). For transducers operating in ultrasonic frequencies, the sensors are mounted in a tungsten-rubber composite isolation material.

Electronics 1312 is used to activate the acoustic transducers to produce acoustic energy and/or make measurements of acoustic energy. Electronics 1312 is controlled by and feeds data to other components and the surface via connection to tool bus 1193. Toolbus 1193 is shown housed in electrical conduit 1358. Tool joint 1350 is shown between sensor module 1310 and the module immediately above sensor module 1310. At tool joint 1350 the electrical conduit 1358 connects to electrical conduit 1356 from the module above. Also housed within conduits 1356 and 1358 are one or more power lines (not shown). Fluid flowline conduit 1354 connected to fluid flowline conduit 1352 also at tool joint 1350. The tool fluid flow line allows the communication of fluid between the modules. For specific applications, for example, fluid connection is made to the formation, and the sample chambers have valves that connect the sample cylinder to the flowline. According to embodiments, acoustic transducer 1330 is provided in acoustic and preferably fluid communication with fluid flowline conduit 1354, such that measurements and analysis of the fluids flowing in the flowline can be made as described in further detail herein. Depending on the placement of the sensor module 1310 within the tool string, different aspects of the tool, annular region, formation, and/or formation fluid can be analyzed acoustically.

FIG. 13B is a cross-section along the line X-X' shown in FIG. 13A. As shown, acoustic transducers 1320 and 1324 are mounted on mandrel section 1342. The acoustic transducers are positioned in a recessed manner for protection. Also shown in FIG. 13B is fluid flowline conduit 1354, electrical conduit 1358 and tool bus 1193. According to embodiments, FIG. 13C shows two further acoustic transducers 1322 and 1326 mounted at a different longitudinal position on mandrel section 1324. Note that the transducers 1322 and 1326 are also in position perpendicular to the transducers 1320 and 1324 shown in FIG. 13B, thus forming an array of acoustic transducers. Also shown in FIG. 13C is fluid flowline conduit 1354, electrical conduit 1358 and tool bus 1193.

According to embodiments, acoustic transducers 1320, 1322, 1324 and 1326 are excited by a continuous-wave voltage to probe annular region bounded by the annulus when acoustic sensor module 1310 is positioned between two packers as in the arrangement shown in FIG. 12A. The current response is recorded and the voltage-to-current ratio gives an electrical impedance measurement reflective of the acoustic properties of the enclosed fluid and the elasto-dynamic properties of the surrounding formation. The frequency is preferably swept through an appropriate bandwidth to capture a sufficient amount of data to determine material parameters such as acoustic velocity, acoustic attenuation, formation acoustic impedance, formation permeability.

According to further embodiments, a full-azimuthal-coverage ultrasonic array is provided in the packed-off section of tool such as Schlumberger's Modular Dynamics Tester tool (MDT) such that an image of the mechanical behaviour of the borehole can be made during a mini-frac job. Acoustic transducers 1320, 1322, 1324 and 1326 could be used for such an application alone, or additional spaced apart transducers can be provided to further improve azimuthal resolution. With a real-time image at 30 frames per second, quantitative observations of the deformation of the borehole wall during pump-up and the initiation of the fracture are made. Additionally, the location and orientation of the induced fracture is precisely determined.

Figure 14:
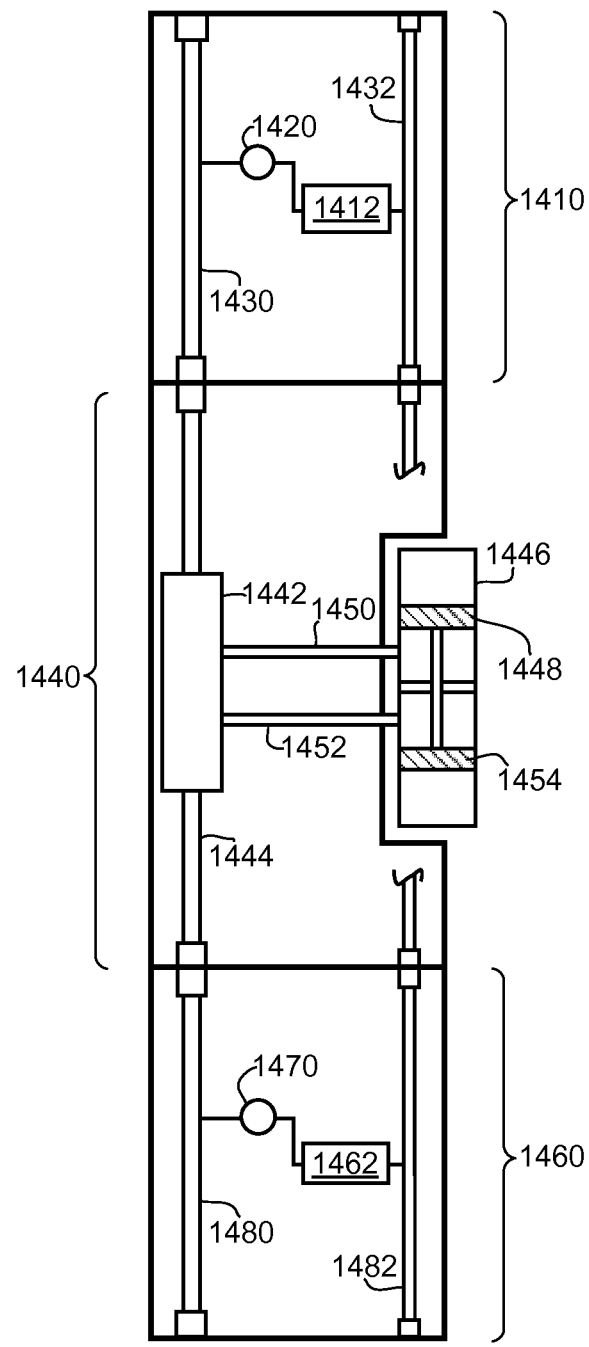
FIG. 14 shows two acoustic sensor modules near a pump out module, according to embodiments.

FIG. 14 show two acoustic sensor modules near a pump out module, according to embodiments. Sensor module 1410 is mounted above pump out module 1440, and sensor module 1460 is mounted below pump out module 1440. Sensor module 1410 includes an acoustic transducer 1420 which is positioned to measure acoustic energy within fluid flowline 1430. Electronics 1412 is used to activate acoustic transducer 1420 to produce acoustic energy and/or make measurements of acoustic energy within fluid flowing 1430. Electronics 1412 is controlled by and feeds data to other components and the surface via connection to a tool bus (not shown) housed within electrical conduit 1432. Similarly, sensor module 1460 includes an acoustic transducer 1470 which is positioned to measure acoustic energy within fluid flowline 1480. Electronics 1462 is used to activate acoustic transducer 1470 to produce acoustic energy and/or make measurements of acoustic energy within fluid flowing 1480. Electronics 1462 is controlled by and feeds data to other components and the surface via connection to a tool bus (not shown) housed within electrical conduit 1482. Pump out module 1440 includes check valve unit 1442 and displacement unit 1446. Displacement unit 1446 in turn, includes an upper piston 1448 and a lower piston 1454. The pistons are rigidly attached to each other and are actuated up and down within displacement unit 1446 by action of hydraulic fluid being alternatingly pumped into the upper and lower portions of the displacement unit. Fluid in fluid flowline 1444 can be pumped in either direction by control of four check valves (not shown) within check valve unit 1442 and upper conduit 1450 and lower conduit 1452.

In the arrangement shown in FIG. 14, the acoustic sensors modules 1410 and 1460 can be used to monitor tool performance. Specifically the sensor modules are in position to accurately monitor performance of pump out module 1440. According to other embodiments, sensor modules 1410 and 1460 are used to detect phase change within the tool. By positioning two sensor modules, one on either side of the pump out module, phase breakout can be detected on the low pressure side of the pump out module and phase recombination can be detected at the high pressure side of the pump out module.

Figure 15:
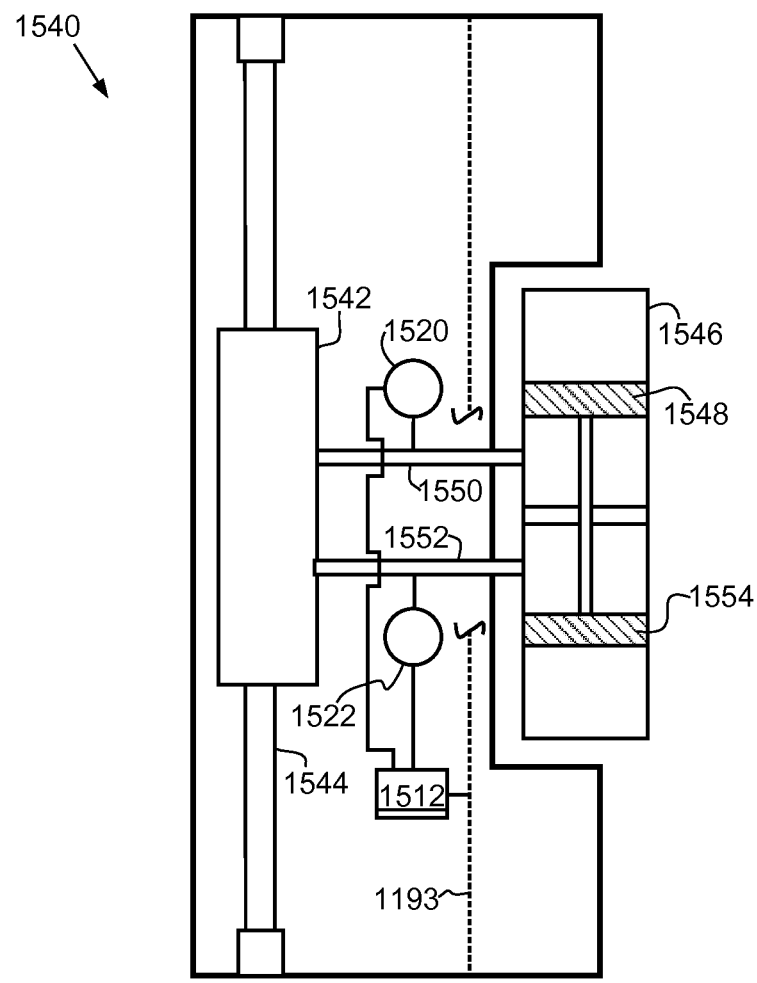
FIG. 15 shows a pump out module including acoustic transducers, according to embodiments.

FIG. 15 shows a pump out module including acoustic transducers, according to embodiments. Pump out module 1540 includes check valve unit 1542 and displacement unit 1546. Displacement unit 1546 in turn, includes an upper piston 1548 and a lower piston 1554. The pistons are rigidly attached to each other and are actuated up and down within displacement unit 1546 by action of hydraulic fluid being alternatingly pumped into the upper and lower portions of the displacement unit. Fluid in fluid flowline 1544 can be pumped in either direction by control of four check valves (not shown) within check valve unit 1542 and upper conduit 1550 and lower conduit 1552. Acoustic transducer 1520 is positioned to measure acoustic energy within upper conduit 1550, and acoustic transducer 1522 is positioned to measure acoustic energy within lower conduit 1552. Electronics 1512 is used to activate acoustic transducers 1520 and 1522 to produce acoustic energy and/or make measurements of acoustic energy within conduits 1550 and 1552. Electronics 1512 is controlled by and feeds data to other components and the surface via connection to a tool bus 1193 housed within a electrical conduit (not shown).

In the arrangement shown in FIG. 15, the acoustic transducers 1520 and 1522 can be used to monitor tool performance just as the sensor modules in FIG. 14. The acoustic transducers 1520 and 1522 in an ideal position to monitor performance of pump out module 1540. According to other embodiments, acoustic transducers 1520 and 1522 are used to detect phase change within the tool. Phase breakout can be detected on the low pressure side of the pump out module and phase recombination can be detected at the high pressure side of the pump out module.

Figure 16:
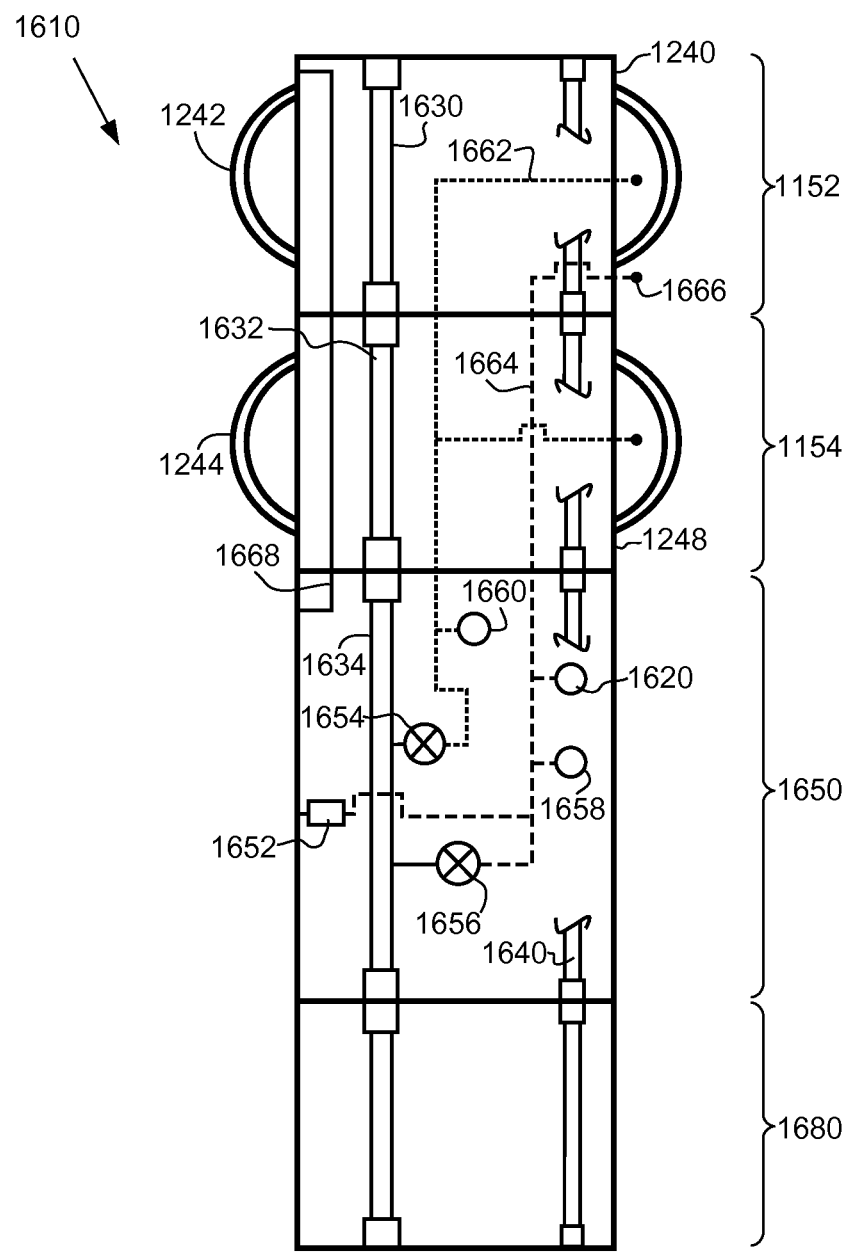
FIG. 16 is a schematic diagram of a dual-packer module according to embodiments.

FIG. 16 is a schematic diagram of a dual-packer module according to embodiments. Dual-packer module 1610 includes upper packer element 1152, lower inflatable packer element 1154, valve body 1650 and electronics body 1680. Upper packer element 1152 includes inflatable member 1242 securely mounted to mandrel section 1240. Also shown is tool fluid flowline section 1630. Lower packer element 1154 includes inflatable member 1244 securely mounted to mandrel section 1248, and tool fluid flowline section 1632. Valve body 1650 includes tool fluid flowline section 1634. Inflate valve 1654 controls fluid in inflate line 1662 which inflates and deflates inflatable elements 1242 and 1244. Inflate pressure transducer 1660 measures the pressure on inflate line 1662. Interval valve 1656 controls flow between the tool fluid flow line and interval flowline 1664 which leads to interval inlet 1666. Interval check valve 1652 is provided between interval flowline and the exterior of valve body 1650 in a location outside the interval. Pressure transducer 1658 monitors fluid pressure in interval flow line 1664. Acoustic transducer 1620 is positioned as shown to make acoustic measurements on interval flow line 1664. Also shown is electrical conduit 1640 which houses both power lines and the tool bus (not shown). Bypass line 1668 connects annular fluid above the upper packer with annular fluid below the lower packer.

Figure 17:
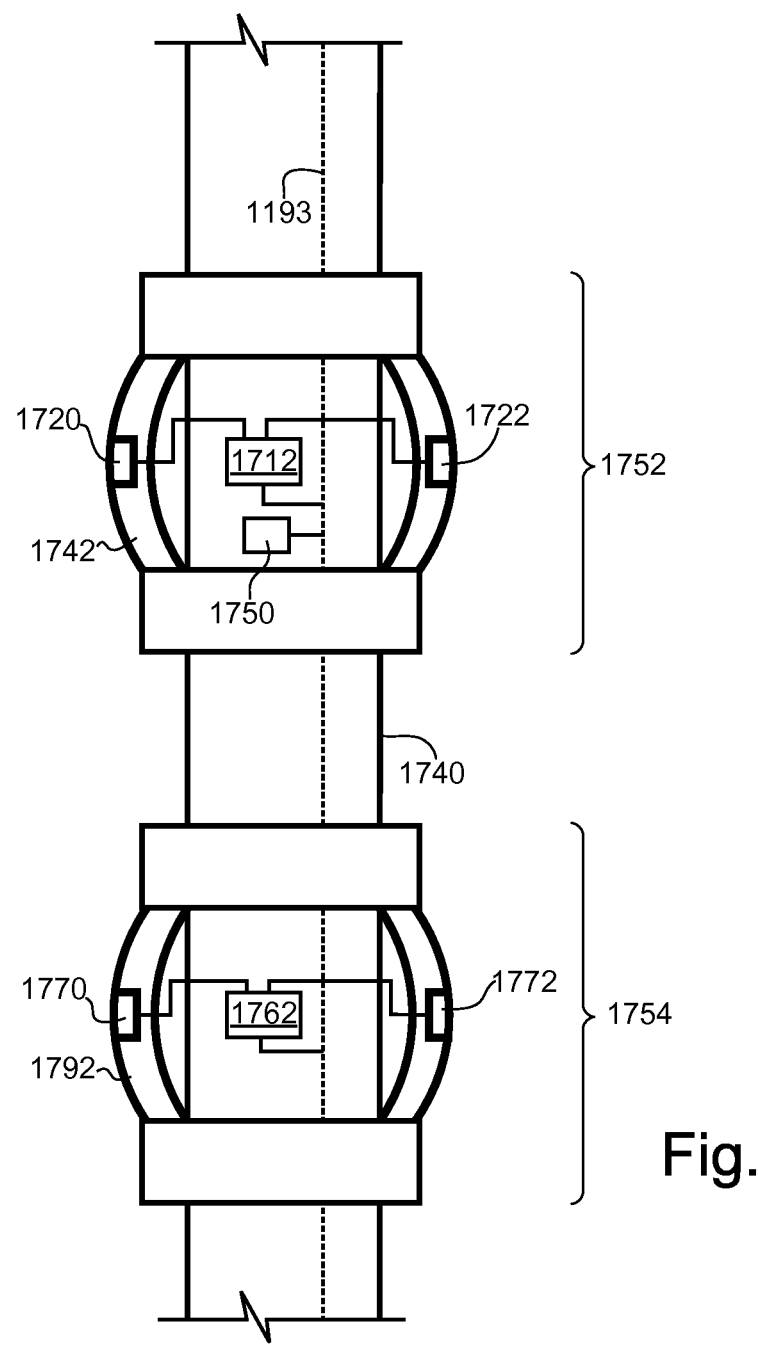
FIG. 17 shows a dual-packer module with acoustic transducers mounted for contact with the borehole wall, according to embodiments.

FIG. 17 shows a dual-packer module with acoustic transducers mounted for contact with the borehole wall, according to embodiments. Packer element 1752 includes inflatable packer member 1742 attached to rigid mandrel 1740. Two acoustic transducers 1720 and 1722 are mounted on the exterior of packer member 1742 such that when packer member 1742 is inflated, transducers 1720 and 1722 make firm contact with the borehole wall. Electronics 1712 is used to activate acoustic transducers 1720 and 1722 to produce acoustic energy and/or make measurements of acoustic energy transmitted through the formation rock. Electronics 1712 is controlled by and feeds data to other components and the surface via connection to a tool bus 1193. According to further embodiments, a directional sensor 1750 is provided as part of packer element 1752 so that the azimuthal position of the acoustic transducers is known in the well during measurement. According to yet further embodiments, additional acoustic transducers are positioned in a spaced apart manner about the outer most portion of inflatable member 1742, such that the transducers contact the borehole wall upon inflation of member 1742. Providing arrays of 4, 6, 8, 16 or greater numbers of spaced-apart transducers can be provided to increase azimuthal resolution. Note that this arrangement does not require the presence of the second packer (although a second packer is shown in FIG. 17), or a pressurized interval in order to perform tests on the formation. According to an embodiment, a single-packer system is designed to change the effective stress on the formation wall outside the packer by exerting force on the borehole wall. The spaced apart acoustic transducers are used to monitor changes in acoustic properties as a function of azimuth and effective stress.

According to other embodiments a second packer element 1754 is provided which includes inflatable packer member 1792 attached to rigid mandrel 1740. Two acoustic transducers 1770 and 1772 are mounted on the exterior of packer member 1792 such that when packer member 1792 is inflated, transducers 1770 and 1772 make firm contact with the borehole wall. Electronics 1762 is used to activate acoustic transducers 1770 and 1772 to produce acoustic energy and/or make measurements of acoustic energy transmitted through the formation rock. Electronics 1762 is controlled by and feeds data to other components and the surface via connection to a tool bus 1193. According to embodiments, the acoustic transducers on one of the packers, for example at least one of the transducers 1770 and 1772 on packer element 1675 is designed and controlled to act as an acoustic source, including an ultrasonic source, and the transducers in the other packer, for example transducers 1720 and 1722 on packer element 1752 are designed and controlled to act as acoustic receivers. In this way, transmitted or "pitch-catch" type acoustic analysis is provided.

Figure 18:
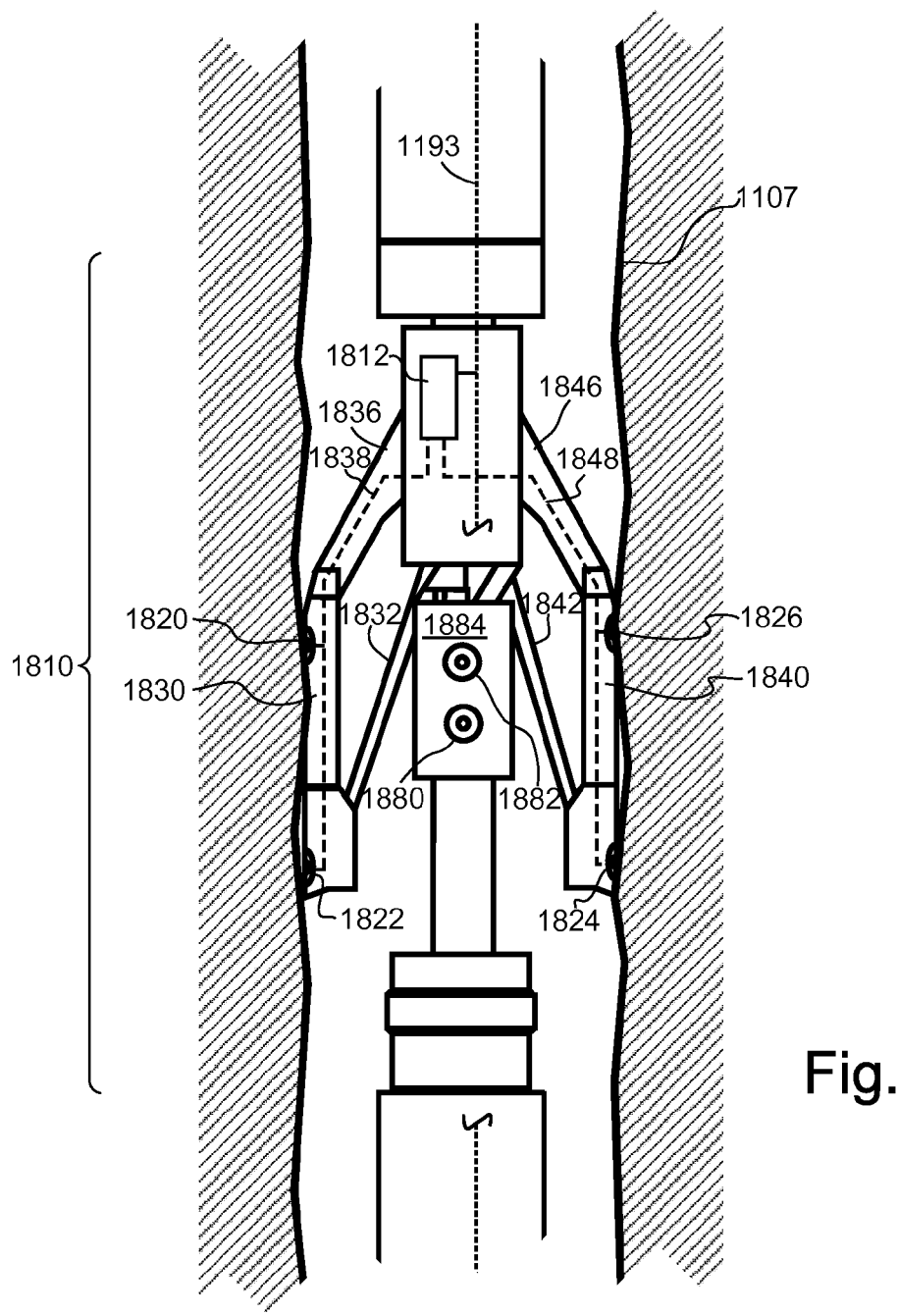
FIG. 18 shows an acoustic transducer module for coupling acoustic sensors to a borehole wall, according to embodiments.

FIG. 18 shows an acoustic transducer module for coupling acoustic sensors to a borehole wall, according to embodiments. Acoustic transducer module 1810 forms part of a wireline toolstring such as toolstring 1101 in wireline system 1100 as shown in FIG. 11. Acoustic module 1810 includes extending arm member 1836 and sensor pad 1830 which makes firm contact with the borehole wall 1107. Sensor pad 1830 is actuated and held in place using cross link member 1832. Mounted on pad 1830 are two acoustic transducers 1820 and 1822. Electronics 1812, via electrical lines 1838, activates acoustic transducers 1820 and 1822 to produce acoustic energy and/or make measurements of acoustic energy transmitted through the formation rock. Electronics 1812 is controlled by and feeds data to other components and the surface via connection to a tool bus 1193. Acoustic module 1810 includes second extending arm member 1846 and sensor pad 1840 which makes firm contact with the borehole wall 1107. Sensor pad 1840 is actuated and held in place using cross link member 1842. Mounted on pad 1840 are two acoustic transducers 1824 and 1826. Electronics 1812, via electrical lines 1848, activates acoustic transducers 1824 and 1826 to produce acoustic energy and/or make measurements of acoustic energy transmitted through the formation rock. Two further arms are included for a total of four arms. Sensor pad 1884 is shown on which two acoustic transducers 1880 and 1882 are mounted. Note that transducers 1820 and 1822 are axially spaced apart along pad 1830, and transducers 1824 and 1826 are axially spaced apart on pad 1840. Providing an axial spacing can be useful in evaluating rock stress related information as is describe in further detail below.

Figure 19:
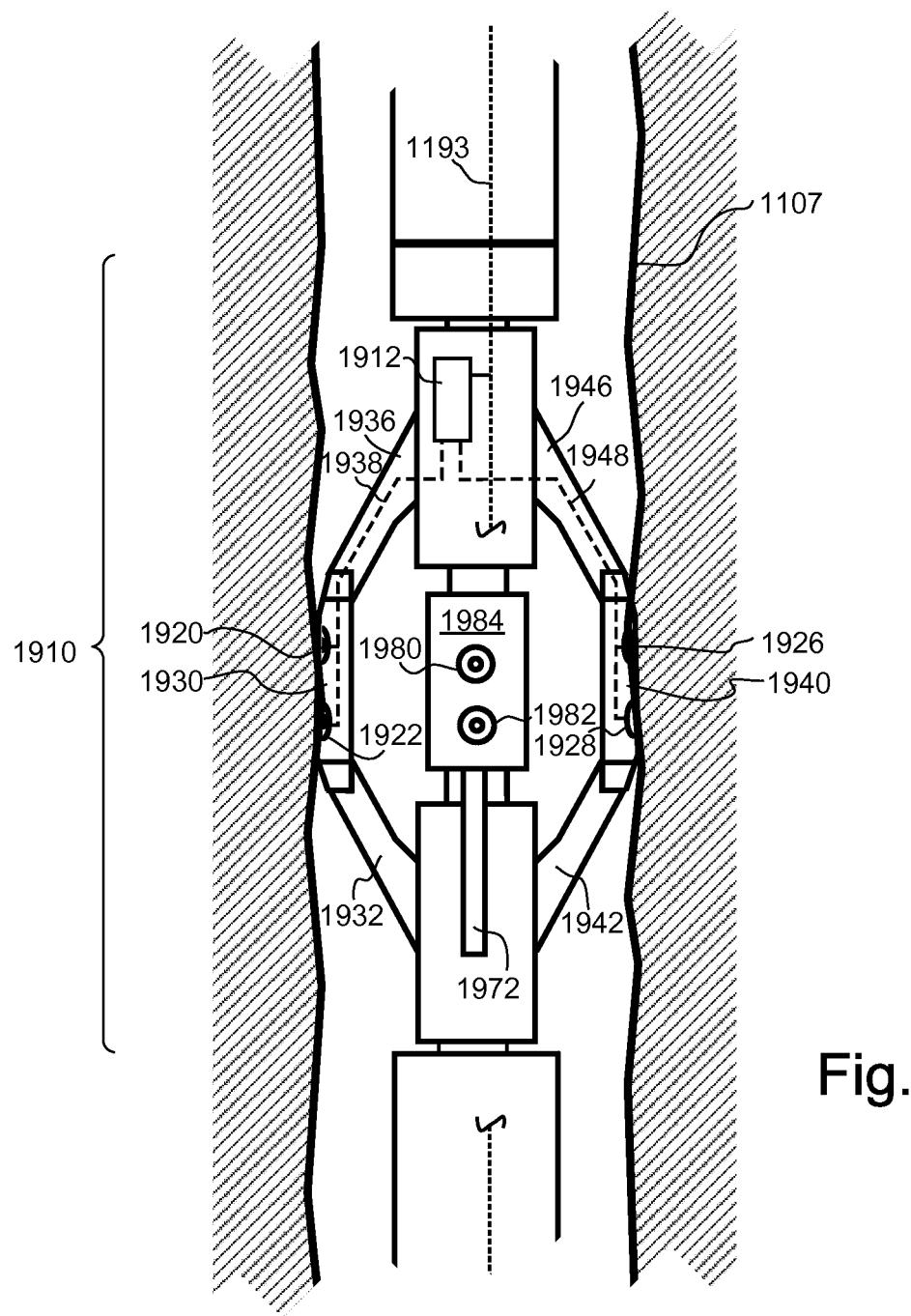
FIG. 19 shows an acoustic transducer module for coupling acoustic sensors to a borehole wall, according to further embodiments.

FIG. 19 shows an acoustic transducer module for coupling acoustic sensors to a borehole wall, according to further embodiments. Acoustic transducer module 1910 forms part of a wireline toolstring such as toolstring 1101 in wireline system 1100 as shown in FIG. 11. Acoustic module 1910 is similar to module 1810 shown in FIG. 18, except that there are extending arms on both top and bottom sides of the sensor pad. This arrangement allows the tool to move downward in the borehole without the need of closing the arms. Additionally, the pads are spring loaded to keep them extended and in contact with the formation. As shown, acoustic module 1910 includes extending arm members 1936 and 1932, and sensor pad 1930 which makes firm contact with the borehole wall 1107. Sensor pad 1930 is actuated and held in place using springs (not shown). Mounted on pad 1930 are two acoustic transducers 1920 and 1922. Electronics 1912, via electrical lines 1938, activates acoustic transducers 1920 and 1922 to produce acoustic energy and/or make measurements of acoustic energy transmitted through the formation rock. Electronics 1912 is controlled by and feeds data to other components and the surface via connection to a tool bus 1193. Acoustic module 1910 also includes extending arm members 1946 and 1942, and sensor pad 1940 which makes firm contact with the borehole wall 1107. Pad 1940 is actuated and held in place using springs (not shown). Mounted on pad 1940 are two acoustic transducers 1924 and 1926. Electronics 1912, via electrical lines 1948, activates acoustic transducers 1924 and 1926 to produce acoustic energy and/or make measurements of acoustic energy transmitted through the formation rock. Two further sensor pads are included for a total of four sensor pads, azimuthally spaced about the axis of the tool and the borehole. Pad 1984 is shown on which two acoustic transducers 1980 and 1982 are mounted. Lower arm 1972 is used in combination and upper arm (not shown) to position pad 1984 against the borehole wall 1107.

Figure 20:
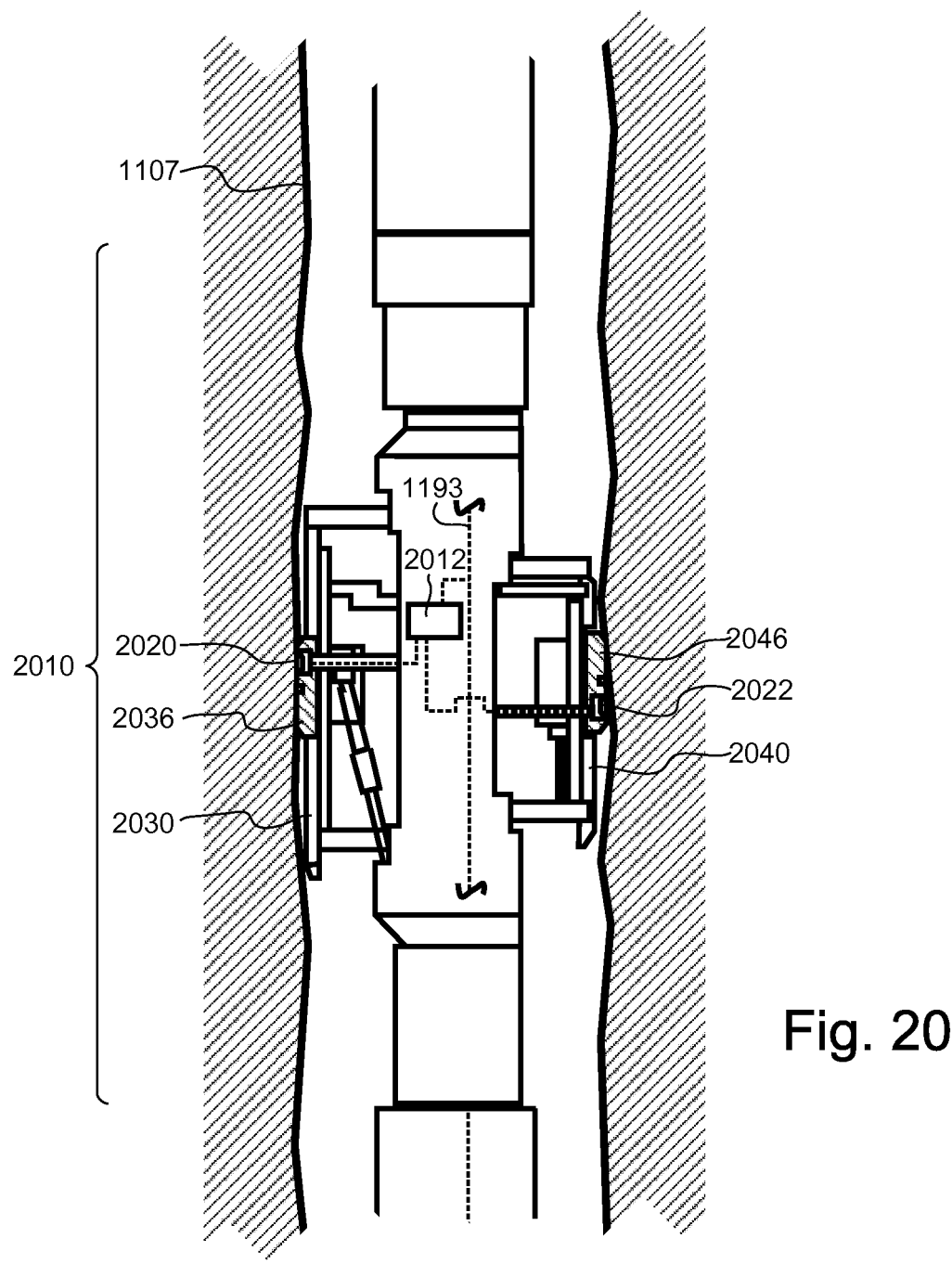
FIG. 20 shows a fluid sampling module having acoustic transducers coupled to a borehole wall, according to further embodiments.

FIG. 20 shows a fluid sampling module having acoustic transducers coupled to a borehole wall, according to further embodiments. Fluid sampling module 2010 forms part of a wireline toolstring such as toolstring 1101 in wireline system 1100 as shown in FIG. 11. Sampling module 2010 is a dual-probe type, although the acoustic transducer could also be adapted to a single probe module. As shown, sensor module 2010 includes extending probe members 2030 and 2040. Probe member 2030 has a packer 2036 and probe member 2040 has a packer 2046. Each packer makes firm contact with the borehole wall when the probe members are extended. Each packer has a hollow center section for sampling fluid via a tube connected to the central section. Packer 2036 has mounted thereon acoustic transducer 2020, and packer 2022 has mounted thereon acoustic transducer 2022. When the probe members extend, the acoustic transducers thus make firm contact with the borehole wall 1107. Electronics 2012 activates acoustic transducers 2020 and 2022 to produce acoustic energy and/or make measurements of acoustic energy transmitted through the formation rock. Electronics 2012 is controlled by and feeds data to other components and the surface via connection to a tool bus 1193. Thus the arrangements shown in FIG. 20 allow for acoustic measurements to be made directly on the borehole wall during a fluid sampling operation. By providing acoustic transducers that are in contact with the borehole wall, as shown in and described with respect to FIGS. 17-20, improved shear wave acoustic energy can be both imparted into the formation and detected from the formation.

According to further embodiments, acoustic transducers (operating in the sonic and/or ultrasonic range) are used to make multi-channel measurements sensitive to variations in the acoustic response as a function of azimuthal orientation relative to the borehole axis. The transducers can be mounted directly on the packers, such as shown in FIG. 17, or on arms such as shown in FIGS. 18 and 19, in order to press the transducers into contact with the formation. Making firm contact with the formation significantly improves coupling, as well as providing for direct measurement of formation shear slowness.

According to embodiments, arrays of axially spaced apart receivers, placed in contact with the borehole wall, as shown in FIGS. 17-20, at multiple azimuths are used to determine propagation speed and attenuation for signals passing across the array, without a strict requirement for control or synchronization of the sources of the signals.

According to various embodiments, methods and techniques of analyzing acoustic measurements will now be described in further detail. Acoustic measurements made with the transducers described are useful in a wide variety of ways. A simple method for obtaining useful information is passively listening for sounds or changes in sound properties indicative of conditions of interest. For example, sounds or changes in sound properties associated with rock breaking or deforming are detected. The analysis includes detecting sounds or changes in sound properties associated with changes in fluid flow dynamics, such as changes from multiphase to single phase, or the reverse. Other detectable changes include changes from gas to liquid, or the reverse; influx of sand; and presence or absence of fluid flowing, which is a common question when pumping compressible fluids. Sounds or changes in sound properties are also used as a diagnostic of the quality of tool performance, such as the sound of pumps running, valves opening and closing, packers slipping or failing to seal, the opening and closing of sample bottles.

According to certain embodiments, timely detection of failure conditions enables the development of methods to remediate the conditions as they occur. For example, the detection of sand entering the flow lines might enable remediation by various means such as reducing the pump rate, reversing the flow, or releasing a burst of cleansing flow.

The addition of sonic and/or ultrasonic sensors to a dual-packer module such as shown in FIGS. 11, 12, 16 and 17, significantly increases the tools ability to determine properties of the rock formations and formation fluids. In particular, the transducer measurements provide for a determination of how the properties of this system vary when changes are made in the state of one or more conditions subject to active control. Such conditions include, for example, borehole pressure and/or the presence and concentration of treatment fluids. The resonant period for acoustic pulses reverberating in the interval are sensitive to the bulk modulus of the fluid(s) in the interval, to the compliance of the packers, and to the hoop strength and permeability of the borehole wall. Changes in fluid property (e.g. by influx of gas) or rock strength (e.g. due to tensile failure) can be associated with observable changes in this period. Similarly, changes in viscosity of the fluid(s) or permeability of the borehole wall can be associated with observable changes in attenuation of acoustic pulses. Measured changes in sound velocity or attenuation depend upon average properties throughout the packed-off interval thereby complementing and constraining measurements made by other, more local sensors.

Changes in properties of the borehole wall are induced, for example, by changes in hydrostatic pressure and/or the introduction of acid or other active chemicals into the packed-off interval. According to embodiments, such changes are monitored by monitoring speed and attenuation of the reverberant pressure transients.

According to certain embodiments, measurements made at various known or well understood conditions are used to calibrate acoustic logs made at other times under conditions that are not well-matched to production conditions or which require estimation of one or more auxiliary parameters. For example, estimates of fracture permeability for natural fracture systems can be estimated from sonic logs by measuring attenuation of Stoneley waves as in the Schlumberger STPerm service performed using a sonic tool such Schlumberger's Sonic Scanner. It is known that this permeability changes when borehole pressure (and therefore effective stress on the formation) changes. Since logs are normally run when borehole pressures are higher than formation pressures (i.e. overbalanced) while production occurs with borehole pressures lower than formation pressures (i.e. underbalanced) the log-based estimates of permeability can be adjusted to account for the change in effective stress. The amount of change depends upon local properties of the formation. By measuring the Stoneley attenuation in the packed interval at a range of fluid pressures, according to embodiments, an improved calibration of the relationship between the log-based values and the values during actual production is provided. Similarly, an adjustment for the presence of mudcake must be made in calculating the log-based values. By recording the changes in Stoneley attenuation as flow from the formation into the tool reduces the mudcake, an improved ability to compensate for this effect in the entire logged zone is provided.

It is known that fractures in the rock matrix near the wellbore are associated with anisotropy in the elastic tensors governing sound propagation through that rock matrix. According to embodiments, providing acoustic transducers in the packers such as shown in FIG. 17, monitoring of the development of that anisotropy as a function of time and borehole pressure is provided.

In a single-packer system designed to change the effective stress on the formation wall outside the packer and to monitor changes in acoustic properties as a function of azimuth and effective stress, the system response tends to have the symmetries of the local stress field. In particular, in a vertical well, the system has mirror symmetry about the vertical planes containing the minimum and maximum horizontal stresses. Supposing that we make a tool with sufficient rotational symmetry, these principal directions will therefore be observable whenever the two principal horizontal stresses are unequal. For example, in the arrangement shown in FIG. 17, the upper packer can include four azimuthally equal spaced receivers, and the lower packer can include four azimuthally equal spaced transmitters. According to further embodiments, 8 equally spaced transmitters and 8 equally spaced receivers are provided so as to enable an evaluation of quadrapole modes. By observation the changes in acoustic behavior that result from changes in packer pressure (hence, in effective stress) analysis of rock strength parameters is provided. See, e.g., T. Bratton, V. Bricout, R. Lam, T. Plona, B. Sinha, K. Tagbor, and A. Venkitaraman, and T. Borbas, "Rock Strength Parameters From Annular Pressure While Drilling and Dipole Sonic Dispersion Analysis," SPWLA Annual Logging Symposium, Jun. 6-9, 2004, which is incorporated by reference herein. Velocity measurements can be made as pressure is cycled up, and back down. This could be done in large pressure cycles, or in very small pressure cycles, at any pressure along the larger cycle, to provide a more complete characterization of the static and dynamic rock moduli. Additionally, this information can be correlated with the occurrence of the stress-induced fracture, which is a definite indicator of exceeding local tensile strength.

The extraction of derivatives of propagation speeds as a function of stress enables the determination of hyperelastic constants characterizing the rock, for example as in Sinha, B. K., 1996, "Estimation of formation nonlinear constants by sonic measurements while changing borehole pressures," 66th Annual Internat. Mtg., Soc. Expl. Geophys., 118-121, which is incorporated by reference herein.

Ultrasonic Doppler measurement of fluid velocity enable observation and mapping of the influx of borehole fluid into a propagating fracture and the back-flow when pumping pressure is relieved.

Figure 21:
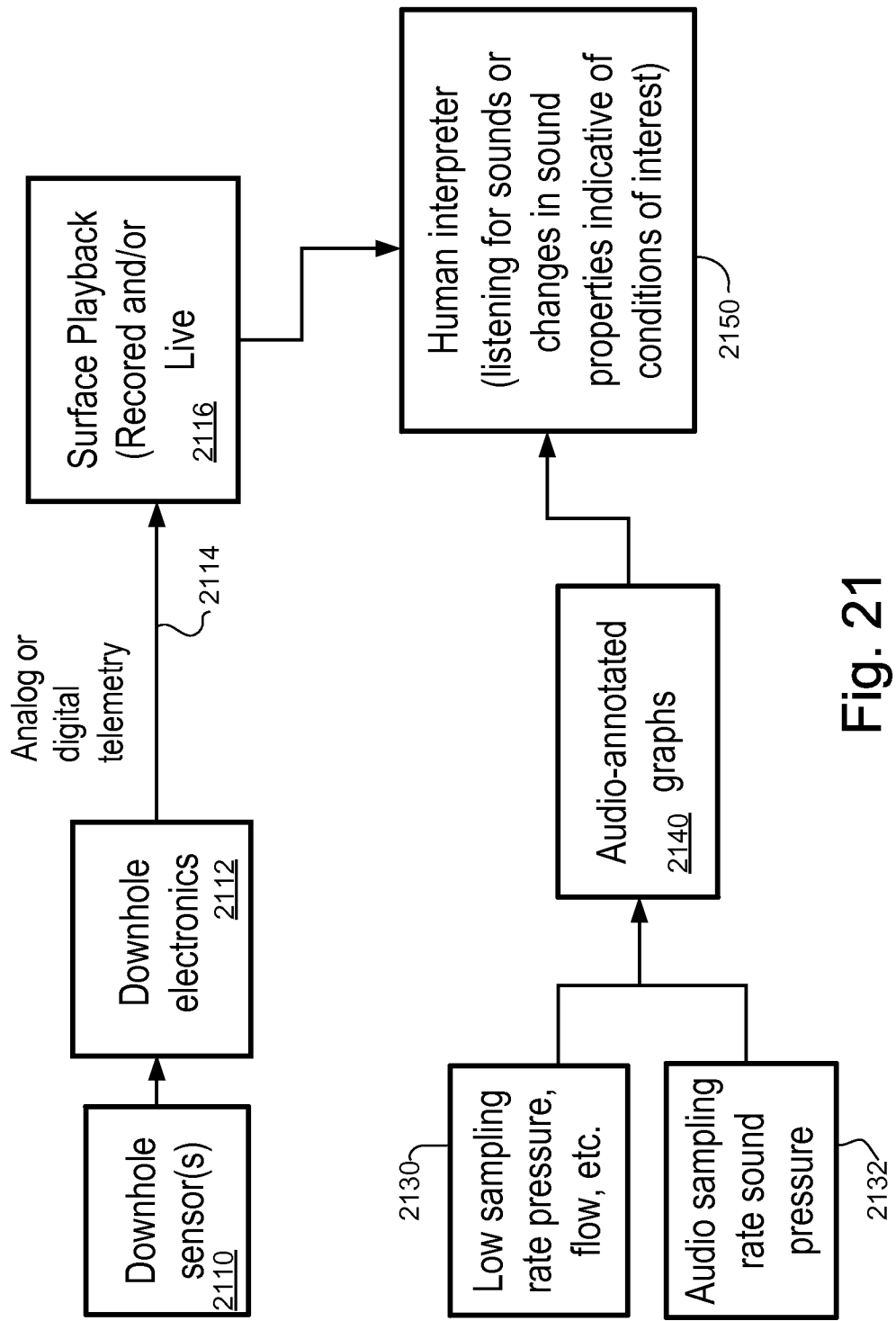
FIG. 21 is a block diagram showing a general workflow for interpreting acoustic data from a wellbore, according to embodiments.

FIG. 21 is a block diagram showing a general workflow for interpreting acoustic data from a wellbore, according to embodiments. Downhole sensors 2110 and downhole electronics 2112 are preferably acoustic transducers and downhole electronics such as shown and described with respect to in FIGS. 10-20. Analog or digital telemetry arrow 2114 represents the transmission of the measurement data to the surface, such as via tool bus 1193, telemetry unit 1191, and wireline 1103 to system 1105 shown and described with respect to FIG. 11. Surface playback 2116 takes place on the surface and can either be live by human interpreter 2150, such as an engineer or other analyst in the wireline truck or wireline unit, or can be recorded and played back to an engineer or analyst either locally or in a remote location. The human interpreter 2150 preferably listens for sounds or changes in sound properties that tend to indicate conditions that are of interest for the particular application. For example, the human interpreter can be listening to the audio signal for signs of a fluid phase change, sand entry, rock fracturing, and/or the movement or slippage in the packers. Also shown in FIG. 21 is another method of interpreting the data using display or other visual techniques. Low sampling rate data 2130 such as pressure, flow rate, etc. which is conventionally measured and recorded during sampling and testing is combined with audio sampling rate sound pressure data 2132, for example made by transducers and electronics as shown and described with respect to FIGS. 10-20. The data is combined in audio-annotated graphs 2140 which can take the form, for example as is common in MP3 sound editing software that displays a visualization of the acoustic data. The combined graphs can then be viewed by the human interpreter 2150 who will visually analyzes the audio-annotated graphs for signs that indicate conditions that are of interest for the particular application. According to embodiments the techniques shown in FIG. 21 can be used to evaluate rock fractures induced by pumping and increasing pressure in the annulus of a packed off region. According other embodiment, the techniques shown in FIG. 21 can be used to monitor tool performance, for example monitoring pump performance, monitoring valves opening and closing and monitoring other moving parts within the tool. In another example, the techniques shown in FIG. 21 are used to detect phase change within tool. Using the arrangements shown in FIG. 14 and/or FIG. 15, phase breakout can be detected at low pressure side of the pump, and phase recombination can be detected at high pressure side of the pump.

Figure 22A:
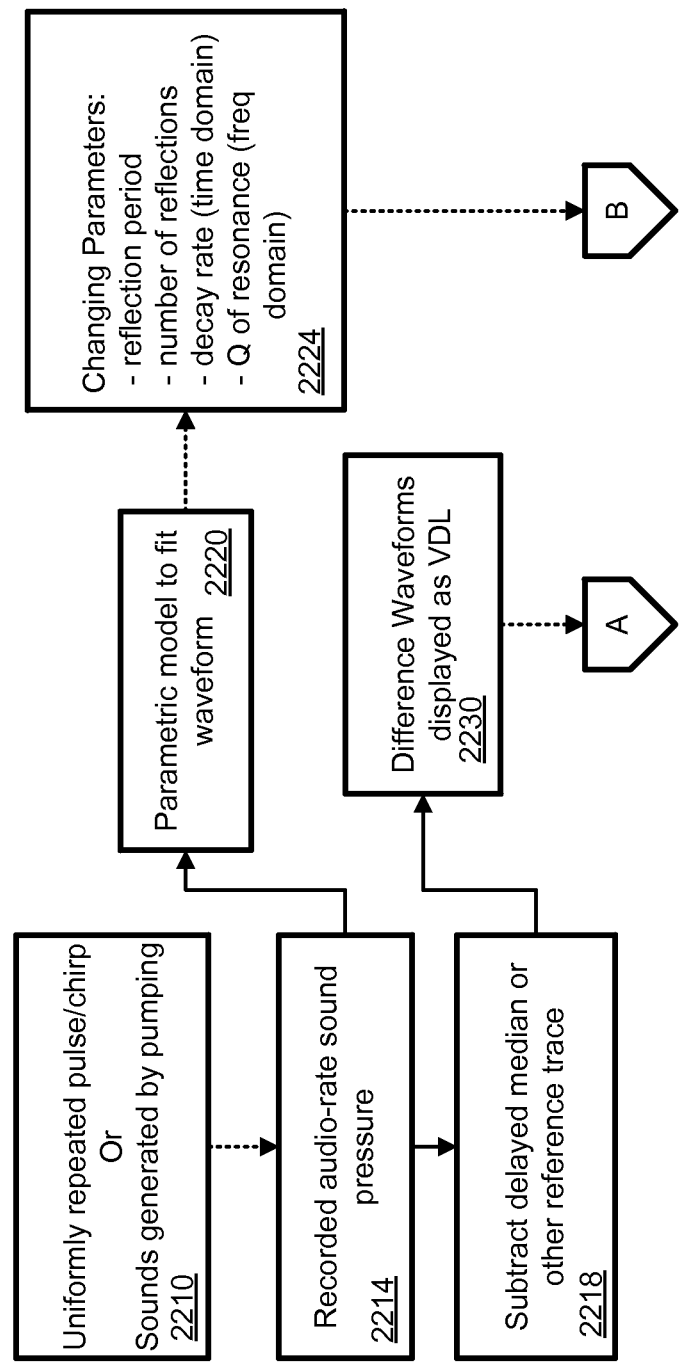
FIGS. 22A and 22A are flow charts showing steps of interpreting acoustic data, according to embodiments.
Figure 22B:
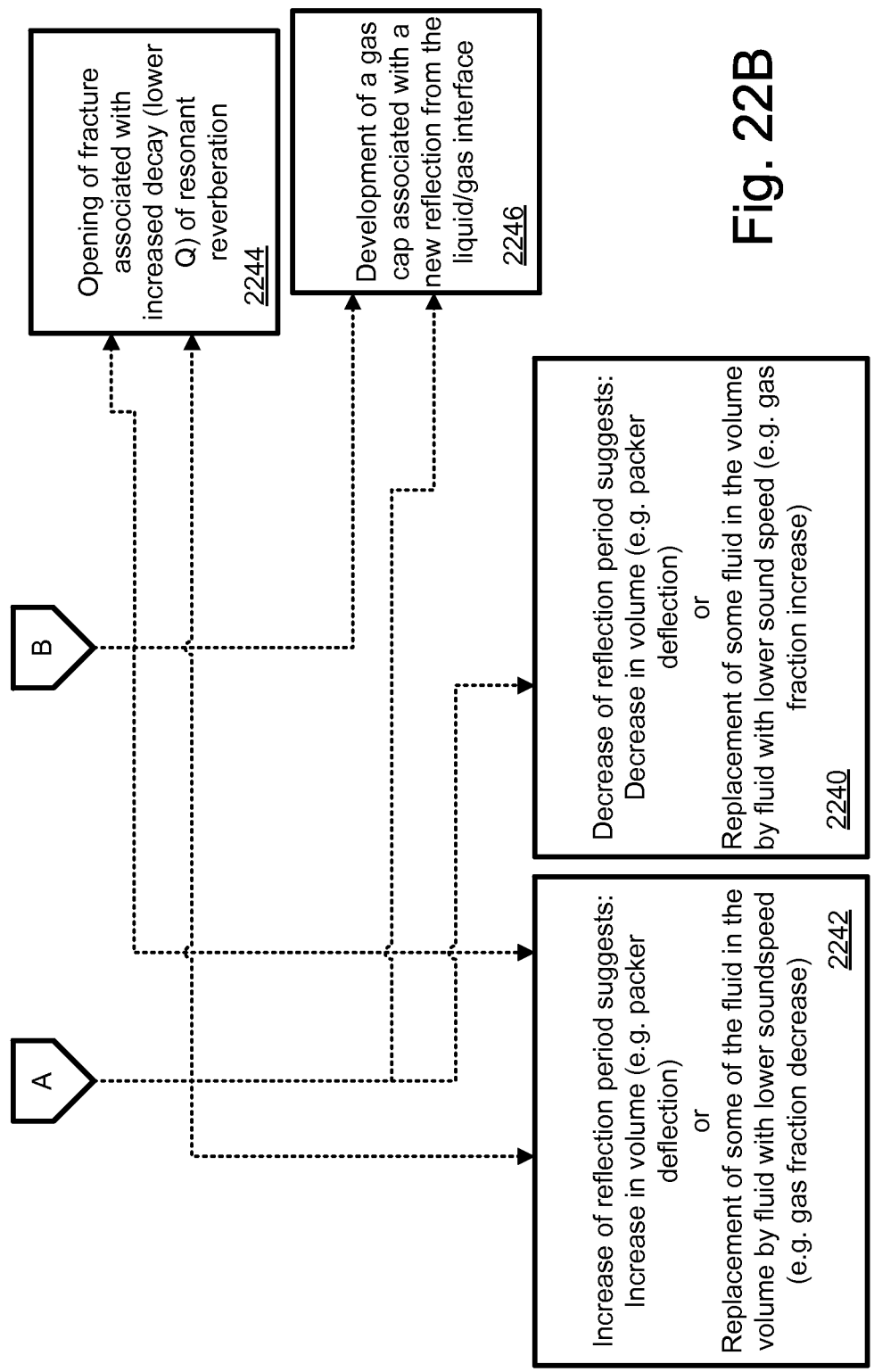

FIGS. 22A and 22B are flow charts showing steps of interpreting acoustic data, according to embodiments. In step, 2210 uniform repeated acoustic energy pulses or chirps are generated. According to embodiments, the repeated pulse or chirp is caused by actuating the acoustic transducers to generate acoustic energy, as described with respect to FIGS. 12-20. According to further embodiments, the pulses are caused by opening or closing a valve or modifying a valve such as interval valve 1656 that controls flow between the tool flow line and interval flowline 1664 as shown in and described with respect to FIG. 16. According to yet further embodiments, the acoustic energy is caused by a pump, such as in the displacement unit 1446 in pump out module 1440 shown in and described with respect to FIG. 14. According to further embodiments, the acoustic transducers shown in and described with respect to FIGS. 11-20 are capable of generating cross-dipole acoustic energy. For example, in the arrangement shown in FIG. 12B, transducers 1222 and 1226 could be activated simultaneously with opposite polarity, to provide a dipole source. Similarly, the other pair of transducers 1220 and 1224 can act as another dipole source. Both pairs together provide a cross-dipole source by alternating the pairs. In step 2214, the audio-rate sound pressure information is recorded. This is accomplished, for example by surface data acquisition and processing system 1105 as shown in and described with respect to FIG. 11. In step 2218, a delayed median or other reference trace is subtracted from the recorded data. The reference trace subtraction enhances the ability to detect see slight changes or drifts. The reference trace can be an average of a number of past traces, such as 10, 20 or 100 prior traces. For further detail in analyzing the sonic and ultrasonic waveforms, see, U.S. Pat. No. 5,859,811, which is incorporated by reference herein. In step 2230, the difference waveforms are displayed to a visually. One example of a visual display is as a variable density log (VDL) which is commonly used, for example with cement logs. According to alternative embodiments, in step 2220 a parametric model can be fit to the recorded audio-rate waveform to estimate or determine parameters of interest. Preferably, in step 2220, a physics-based parametric model used which is parameterized with variables of interest such as fluid type, fracture size, temperature, pressure, and packer volume. The model generates synthetic waveforms based on the parameters. The parameters are then changed such that the synthetic waveform fits or suitably matches the recorded waveforms. The parameters are associated, in step 2224 with changing conditions in the acoustic signal such as changing reflection period, number of reflections, reflection amplitude decay in the time domain, and Q of resonance in the frequency domain.

FIG. 22B shows various steps for interpreting the changing waveforms (if viewed as a VDL) or changing parameters (according to a parametric model). In steps 2240 and 2242 an interpretation of the changing condition is made. For example, in step 2140 if there is a decrease of reflection period, this suggests either a decrease in volume (e.g. deflection of packer), or a replacement of some fluid in the volume by fluid with lower sound speed (e.g. gas fraction increase). Whereas in step 2242, if there is an increase in the reflection period, this suggests an increase in volume (e.g. deflection of packer), or replacement of some of the fluid in the volume by fluid with lower soundspeed (e.g. gas fraction decrease). Preferably, the interpretations in steps 2240 and 2242 take in consideration the application from which the data has been gathered. For example, if the pressure in the annulus is being increased through pumping into the interval, then an increase in reflection period in step 2242 is associated with an increase in the volume. It has been found for the many applications described herein, the velocity of the fluid, $v_{fluid}$, can be approximated using the following equation:

$$v_{fluid} = \sqrt{\frac{\text{bulk modulus}}{\text{density}}}$$

In step 2244, the opening of a fracture is associated with an increased decay (lower Q) of resonant reverberation. In step 2246, the development of a gas cap is associated with a new reflection from the liquid/gas interface. According to another embodiment fluid properties of the annulus can be monitored with sensors positioned inside the tool body and not directly acoustically exposed to the annular fluid. For example acoustic transducer 1620 in FIG. 16 could be used to make the measurements which are interpreted using the techniques shown in and described with respect to FIGS. 12A and 22B.

Figure 23:
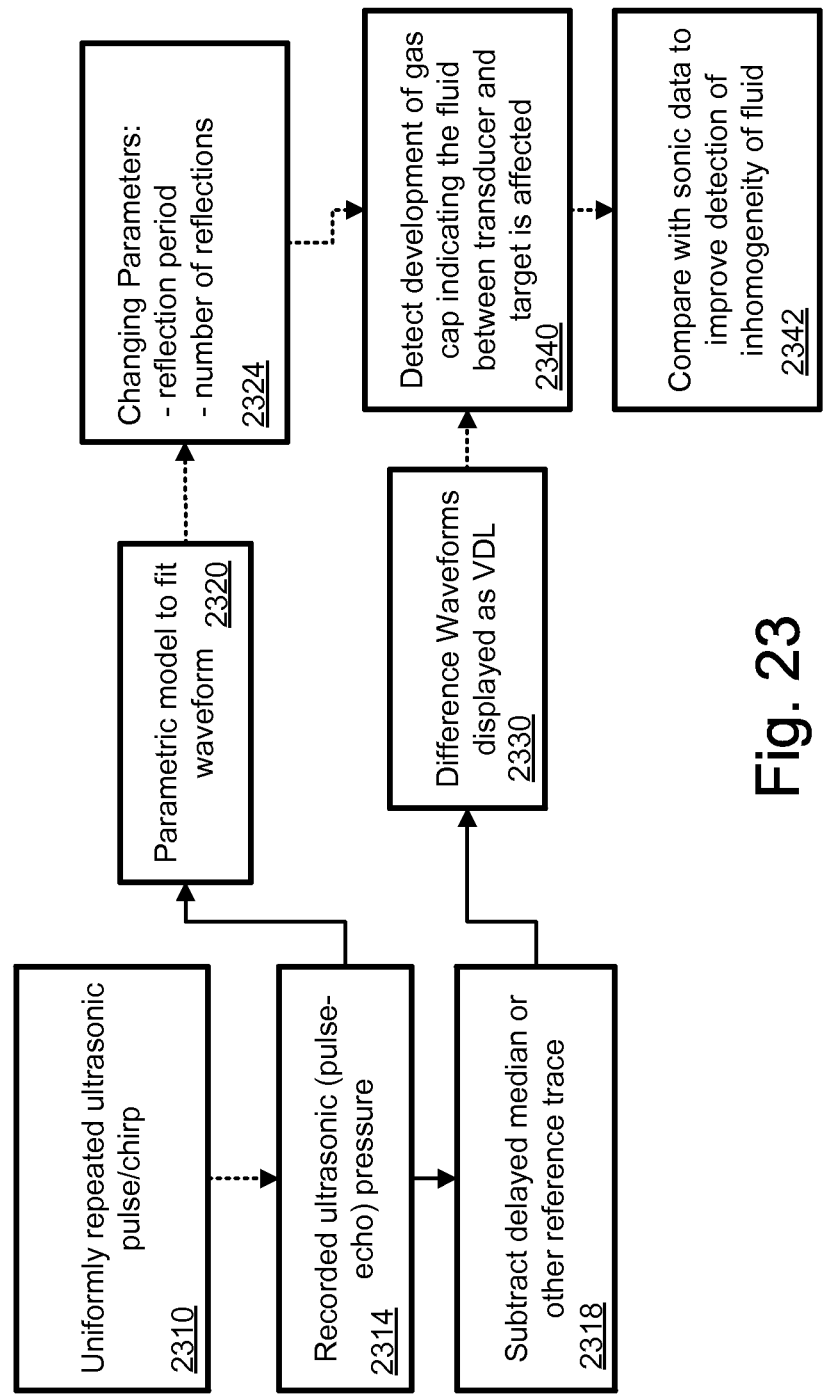
FIG. 23 shows steps involved in interpreting ultrasonic data, according to embodiments.

FIG. 23 shows steps involved in interpreting ultrasonic data, according to embodiments. In step, 2310 uniform repeated ultrasonic energy pulses or chirps are generated. The repeated pulses or chirps are caused by actuating the acoustic transducers to generate acoustic energy, as described with respect to FIGS. 12-20. In step 2314, the ultrasonic (pulse-echo) pressure information is recorded. This is accomplished, for example by surface data acquisition and processing system 1105 as shown in and described with respect to FIG. 11. In step 2318, a delayed median or other reference trace is subtracted from the recorded data, thereby enhancing the ability to detect see slight changes or drifts. The reference trace can be an average of a number of past traces, such as 10, 20 or 100 prior traces. In step 2330, the difference waveforms are displayed to a visually, for example using a variable density log (VDL). According to alternative embodiments, in step 2320 a parametric model can be fit to the recorded ultrasonic waveform to estimate or determine parameters of interest, as in step 2220 of FIG. 22A. The parameters are associated, in step 2324 with changing conditions in the acoustic signal such as changing reflection period and the number of reflections. The development of a gas cap is detected in step 2340. Since the energy is ultrasonic, the development of the gas cap is not evident until fluid between the transducer and target is affected. In step 2342, the interpretations are compared with sonic data interpreted, for example, using the techniques shown in and described with respect to FIGS. 22A and 22B. By comparing the ultrasonic data, which is sensitive to local properties, with lower frequency sonic data, which is sensitive to average fluid properties, measurements to improve detection of inhomogeneity of fluid can be made. For example, gas entering in location remote from ultrasonic transducers can be determined if gas is detected by the sonic data but not the ultrasonic data.

According to embodiments, stress-related rock properties can be evaluated by detecting induced fractures in the formation rock. With a dual packer arrangement, the pressure in the annulus is increased to induce a fracture, such as in a microhydraulic fracturing test. Acoustic transducers are deployed against the borehole wall as shown in FIGS. 17-20. By making acoustic (including ultrasonic) measurements before and during the rock fracturing, the minimum stress direction can be evaluated. According to an embodiment a process is used analogous to that described in U.S. Pat. No. 6,510,389, (hereinafter "the '389 patent") incorporated herein by reference. Although in the '389 patent it is assumed that measurements will be made in an unchanging stress environment with a moving tool, the same analysis is used only the tool is stationary and the rock is fracturing. Specifically, a process shown in and described with respect to FIG. 1 of the '389 patent is carried out for successive acoustic measurements made while incrementing the fluid pressure in the annulus instead of incrementing the depth. Although ultrasonic-range transducers are primarily discussed in the '389 patent, according to present embodiments, sonic frequency transducers can also be used as the scale of measurement is increased.

For increasing azimuthal resolution, larger numbers of acoustic receivers should be provided. For example 8 or 16 or greater numbers of acoustic receivers can be provided in a azimuthally spaced apart manner for each of the embodiments shown in FIGS. 11-20. For example, arrangements of transmitter and receiver arrays such as shown in U.S. Pat. No. 6,678,616, incorporated by reference herein (hereinafter "the '616 patent"), can be used. In particular arrays arrangements shown in FIGS. 10A-10D of the '616 patent can be used with the embodiments shown in and described with respect to FIGS. 11-20 herein. Much of the teaching of the '389 patent and the '616 patent applies to embodiments of the current invention for evaluating stress related rock properties. However, it has been found that by making measurement during the changes in stress, significantly improved evaluations can be made. For example, FIGS. 12A-12E of the '389 patent are variable density logs showing compressional arrival as a function of time and azimuth at a fixed source-receiver spacing of 12 cm for five different stress levels from Stress Test 1: 0 Mpa; 3 Mpa; 9 MPa; 13 MPa; and 19 Mpa, respectively. The data was gathered from tests performed while changing stress on rock samples on the surface. However, according to embodiments of the present invention, such evaluations can be made in-situ downhole. The stress changes may also occur due to other effects induced by pumping activity. For example, the stress changes can be caused by replacement of liquid by gas (or vice versa) in the pore space of the formation between the transmitters and receivers.

For further detail on sonic logging and interpretation, particularly relating to Stonely wave properties and their dependence on fluid properties, rock properties, and state of stress, see the following: Burns, D. R. and Cheng, C. H., "Determination of In-Situ Permeability from Tube Wave Velocity and Attenuation" SPWLA Twenty-Seventh Annual Logging Symposium, KK (Jun. 9-13, 1986); U.S. Pat. No. 4,797,859; and Co-pending U.S. patent application Ser. No. 11/691,071, all of which are incorporated by reference herein. For theoretical and lab studies in geomechanics and stress-induced changes in acoustic properties, see: B. K. Sinha, P. Papanastasiou and T. J. Plona, "Influence of borehole overpressurization and plastic yielding on the borehole Stoneley and flexural dispersions", J. of Geophys. Res., vol. 104(B7), pp. 15,451-15,459, 1999; Winkler, K. W., "Azimuthal velocity variations caused by borehole stress concentrations", J. Geophys. Res., 101, p. 8615-8621, 1996; Winkler, K. W., "Acoustic evidence of mechanical damage surrounding stressed boreholes", Geophysics, 62, p 16-22, 1997; and Plona, T. J. & Cook, J. M. 1995. "Effects of stress cycles on static and dynamic Young's moduli in Castlegate sandstone" Daemen, J. J. K. & Schulz, R. A. (ed.) Proceedings of the 35th U. S. Symposium on Rock Mechanics. Balkema, Rotterdam, 155-160, all of which are incorporated by reference herein.

According to other embodiments, the stress-related information can be evaluated using measurements in the annulus, but not in contact with the borehole wall, as shown in and described with respect to FIGS. 11-16.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A system for measuring acoustic signals during a fracturing operation:
    a downhole toolstring designed and adapted for deployment in a borehole formed within a subterranean rock formation;
    a downhole rock fracturing tool forming part of the toolstring, designed and adapted to open and propagate a fracture in the rock formation using borehole fluid;
        a first and second member designed and positioned to seal a region between the toolstring and a wall of the borehole such that an annular region is defined by the tool housing, the borehole wall, and the first and second members;
    one or more acoustic sources mounted to the toolstring, designed and adapted to transmit acoustic energy into the rock formation and a fluid in the borehole; and
    one or more sensors mounted to the toolstring, designed and adapted to measure an acoustic response of the formation and the fluid, indicative of a parameter of the fracture propagating in the rock formation;
    wherein at least one of the one or more acoustic sources or the one or more acoustic sensors is mounted outside of the annular region.

2. A system according to claim 1 wherein the rock fracturing tool comprises a downhole pumping system mounted to the toolstring and adapted to pump the borehole fluid into the annular region.

3. A system according to claim 1 wherein the one or more acoustic sources include two multi-pole sources each capable of generating a multi-pole acoustic signal.

4. A system according to claim 3 wherein the two multi-pole sources are dipole sources and are mounted such that they are oriented orthogonally with respect to each other.

5. A system according to claim 3 wherein the two multi-pole sources are quadrupole acoustic sources.

6. A system according to claim 1 wherein the one or more sensors includes one or more geophones mounted to the toolstring, designed and adapted to measure part of the acoustic response of the formation and the fluid.

7. A system according to claim 6 wherein each geophone is a 3-axis geophone and is mounted on an extendable member such that the geophone can be in direct communication with the borehole wall and shear components of the acoustic response of the formation and the fluid.

8. A system according to claim 1 wherein the one or more sensors include acoustic sensors that make up an acoustic receiver array including a plurality of receiver stations spaced apart along the axis of the toolstring, and each receiver station including a plurality of azimuthally distributed acoustic sensors at substantially the same axial position.

9. A system according to claim 1 wherein the rock fracturing tool and the one or more acoustic sources and sensors are arranged along the axis of the toolstring such that axial positions of the one or more sources are on one side of a location of the rock formation to be fractured and axial positions of the one or more sensors are on an opposite side of the location of the rock formation to be fractured.

10. A system according to claim 1 wherein the one or more sources and the rock fracturing tool are arranged such that axial positions of the one or more sources and an axial position of a location of the rock formation to be fractured are substantially the same.

11. A system according to claim 1 wherein the one or more sensors and the rock fracturing tool are arranged such that axial positions of the one or more sensors and an axial position of a location of the rock formation to be fractured are substantially the same.

12. A system according to claim 1 wherein the fracturing tool, sources and sensors are arranged on the toolstring such that following an induced fracturing of the rock formation, the toolstring can be repositioned so that the induced fracture is located between the sources and the sensors.

13. A system according to claim 1 wherein the fracturing tool includes a pumping system adapted to inject proppant material into an induced fracture such that closure of the induced fracture is prevented or delayed.

14. A system according to claim 13 wherein the proppant material includes one or more materials selected from the group consisting of calcined calcium carbonate, polyester beads, crystalline sodium chloride, and magnesium oxide.

15. A system according to claim 13 wherein the fracture is propagated with a resinous material that forms a solid mass after a predetermined time.

16. A system according to claim 1 further comprising a processor adapted to evaluate one or more properties of the rock formation, and the evaluation is based at least in part on the acoustic response of the formation and the fluid as measured by the one or more sensors.

17. A system according to claim 16 wherein the one or more properties includes direction and speed of sonic propagation within the rock formation.

18. A system according to claim 16 wherein the one or more properties includes far field stress and/or fracture properties.

19. A system according to claim 16 wherein the one or more properties are for locations having a distance from the borehole wall of greater than a diameter of the borehole.

20. A system according to claim 16 wherein processor is programmed to combine data based on measurements of acoustic response after an induced fracture with reference data based on measurements of acoustic response prior to and/or during the induction of fracturing.

21. A system according to claim 1 wherein the first and second members are expandable packers attached to the rock fracturing tool and making contact with the borehole wall when deployed.

22. A system according to claim 1 wherein the one or more sensors are positioned on the toolstring so as to be in primary acoustic communication with locations other than the annular region.

23. A system according to claim 1 further comprising an orientation tool for making measurements such that measurements from the one or more sensors can be oriented.

24. A method for measuring acoustic signals during a fracturing operation, comprising:
positioning a downhole toolstring in a borehole formed within a subterranean rock formation;
inducing fracturing in the subterranean rock formation using borehole fluid via a rock fracturing tool forming part of the toolstring, further comprising:
sealing an annular region that is a volume bounded by a first sealing member, a second sealing member, the outer surface of the toolstring, and a borehole wall;
transmitting acoustic energy into the rock formation and a fluid in the borehole using one or more acoustic sources mounted to the toolstring; and
measuring an acoustic response of the formation and the borehole fluid using one or more sensors mounted to the toolstring, indicative of a parameter of the fracture propagating in the formation;
wherein at least one of the one or more acoustic sources or the one or more acoustic sensors is mounted outside of the annular region.

25. A method according to claim 24 wherein the one or more acoustic sources are multi-pole acoustic sources, and the acoustic energy transmitted includes multi-pole acoustic energy.

26. A method according to claim 25 wherein the one or more multi-pole acoustic sources include two orthogonally oriented dipole sources and the transmitted acoustic energy includes dipole acoustic energy.

27. A method according to claim 25 wherein the one or more multi-pole acoustic sources include one or more quadrupole acoustic sources and the transmitted acoustic energy includes quadrupole acoustic energy.

28. A method according to claim 24 wherein the one or more sensors include a plurality of acoustic sensors arranged on the toolstring so as to be capable of detecting a multi-pole acoustic response.

29. A method according to claim 24 wherein the one or more sensors include one or more geophones.

30. A method according to claim 29 wherein each of the geophones is a 3-axis geophone mounted on an extendable member such that the geophone can be in direct communication with a borehole wall, and wherein the measuring includes measuring shear components of the acoustic response of the rock formation and the fluid.

31. A method according to claim 24 wherein the rock fracturing tool and the one or more acoustic sources and sensors are arranged along the axis of the toolstring such that axial positions of the one or more sources are on one side of a location of the induced rock fracture and the axial positions of the one or more sensors are on an opposite side of the location of the induced rock fracture.

32. A method according to claim 24 wherein the one or more sources and the rock fracturing tool are arranged on the toolstring such that the axial positions of the one or more sources and the axial position of the induced rock fracture are substantially the same.

33. A method according to claim 24 wherein the one or more sensors and the rock fracturing tool are arranged on the toolstring such that the axial positions of the one or more sensors and the axial position of the induced rock fracture are substantially the same.

34. A method according to claim 24 further comprising repositioning the toolstring after inducing the fracturing such that the induced fracture is between the sources and the sensors.

35. A method according to claim 24 further comprising injecting proppant material into the induced fracture such that closure of the induced fracture is prevented or delayed.

36. A method according to claim 35 wherein the proppant material includes one or more materials selected from the group consisting of calcined calcium carbonate, polyester beads, crystalline sodium chloride, and magnesium oxide.

37. A method according to claim 24 wherein the inducing fracturing includes propagating the induced fracture with a resinous material that forms a solid mass after a predetermined time.

38. A method according to claim 24 further comprising evaluating one or more properties of the rock formation based at least in part on the measuring of the acoustic response of the rock formation and the fluid.

39. A method according to claim 38 wherein the one or more properties includes direction and speed of sonic propagation within the rock formation.

40. A method according to claim 38 wherein the one or more properties includes far field stress and/or fracture properties.

41. A method according to claim 38 wherein the evaluating comprises combining data based on measurements of the acoustic response after the induced fracturing with reference data based on measurements of the acoustic response prior to and/or during the induced fracturing.

42. A method according to claim 26 wherein the transmitting comprises repeatedly generating alternating pulses from each of the two orthogonally oriented dipole sources with a predetermined delay between successive pulses.

43. A method according to claim 24 wherein the fracturing induction further comprises pumping the borehole fluid into the annular region so as to significantly increase a fluid pressure in the annular region thereby inducing the fracture.

44. A method according to claim 43 wherein the one or more sensors are positioned on the toolstring so as to be in primary acoustic communication with locations other than the annular region.

* * * * *